(12) United States Patent
Fukumoto et al.

(10) Patent No.: US 10,583,649 B2
(45) Date of Patent: *Mar. 10, 2020

(54) INK JET RECORDING METHOD AND INK JET RECORDING APPARATUS

(71) Applicant: Seiko Epson Corporation, Tokyo (JP)

(72) Inventors: Hiroshi Fukumoto, Shiojiri (JP); Hiroaki Kida, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 4 days.

This patent is subject to a terminal disclaimer.

(21) Appl. No.: 15/821,561

(22) Filed: Nov. 22, 2017

(65) Prior Publication Data

US 2018/0072047 A1  Mar. 15, 2018

Related U.S. Application Data

(63) Continuation of application No. 13/853,185, filed on Mar. 29, 2013, now Pat. No. 9,827,760.

(30) Foreign Application Priority Data

Apr. 27, 2012 (JP) .................................. 2012-102535
Nov. 14, 2012 (JP) ................................ 2012-250029

(51) Int. Cl.
  *B41J 2/01* (2006.01)
  *B41J 11/00* (2006.01)
  (Continued)

(52) U.S. Cl.
  CPC ............... *B41J 2/01* (2013.01); *B41J 2/0057* (2013.01); *B41J 2/2107* (2013.01); *B41J 11/002* (2013.01); *C09D 11/101* (2013.01); *C09D 11/30* (2013.01)

(58) Field of Classification Search
  CPC ... B41J 2/01; B41J 2/211; B41J 2/1433; B41J 2/17; B41J 2/17593; B41J 2/2107;
  (Continued)

(56) References Cited

U.S. PATENT DOCUMENTS 2,692,256 A  10/1954 Bauer
4,303,924 A  12/1981 Young, Jr.
(Continued)

FOREIGN PATENT DOCUMENTS

CN  102381023 A  3/2012
EP  0 997 508 A1  5/2000
(Continued)

OTHER PUBLICATIONS

U.S. Appl. No. 13/234,666, filed Sep. 16, 2011, Ultraviolet-Curable Ink Jet Ink Composition.
(Continued)

*Primary Examiner* — Manish S Shah
(74) *Attorney, Agent, or Firm* — Workman Nydegger

(57) ABSTRACT

Provided is an ink jet recording method including: discharging an ultraviolet ray-curable ink, which has a viscosity at 20° C. of 25 mPa·s or less and an average equivalent of polymerizable unsaturated double bond of 100 to 150, from a head onto a recording medium at a discharge temperature of 30° C. to 40° C.; and irradiating the ultraviolet ray-curable ink, attached onto the recording medium, with ultraviolet rays emitted from a light source to cure the ultraviolet ray-curable ink.

19 Claims, 2 Drawing Sheets

(51) Int. Cl.
  *B41J 2/21* (2006.01)
  *B41J 2/005* (2006.01)
  *C09D 11/101* (2014.01)
  *C09D 11/30* (2014.01)

(58) Field of Classification Search
  CPC ...... B41J 2/1755; B41J 2/2114; B41J 2/2117;
  B41J 2/2056; B41J 2/21; B41J 2/0057;
  B41J 3/60; B41J 2002/012; B41J
  2/04598; B41J 2/04588; B41J 2/04595;
  B41J 2/04586; B41J 2/14274; B41J
  11/0015; B41J 11/002; B41J 2/161; B41J
  2/1623; B41J 2202/00; B41J 2202/03;
  B41J 2/14201; B41J 2/045; C09D 11/36;
  C09D 11/40; C09D 11/30; C09D 11/38;
  C09D 11/32; C09D 11/322; C09D
  11/324; C09D 11/328; C09D 11/101;
  C09D 11/102; C09D 11/005; C09D
  11/54; C09D 11/52; B41M 5/0011; B41M
  5/0017; B41M 5/0047; B41M 7/00;
  B41M 7/0072; B41M 5/52; B41M 5/5218
  See application file for complete search history.

(56) References Cited

U.S. PATENT DOCUMENTS

| | | | |
|---|---|---|---|
| 4,577,205 | A | 3/1986 | Shibata et al. |
| 5,266,106 | A | 11/1993 | Breton |
| 5,275,646 | A | 1/1994 | Marshall et al. |
| 5,596,027 | A | 1/1997 | Mead et al. |
| 5,641,346 | A | 6/1997 | Mantell et al. |
| 5,889,084 | A | 3/1999 | Roth |
| 5,897,695 | A | 4/1999 | Mayo et al. |
| 6,187,897 | B1 | 2/2001 | Kawashima et al. |
| 6,310,115 | B1 | 10/2001 | Vanmaele et al. |
| 7,963,625 | B2 | 6/2011 | Okada |
| 8,227,047 | B2 | 7/2012 | Loccufier et al. |
| 8,664,291 | B2 | 3/2014 | Kida et al. |
| 9,034,940 | B2 | 5/2015 | Kida et al. |
| 9,056,986 | B2 | 6/2015 | Kagose et al. |
| 9,458,338 | B2 | 10/2016 | Kagose et al. |
| 9,493,667 | B2 | 11/2016 | Kida et al. |
| 9,782,982 | B2 | 10/2017 | Yoshida et al. |
| 9,796,193 | B2 | 10/2017 | Yoshida et al. |
| 9,827,760 | B2 | 11/2017 | Fukumoto et al. |
| 9,837,788 | B2 | 12/2017 | Akasaka et al. |
| 9,873,808 | B2 | 1/2018 | Kida et al. |
| 9,884,487 | B2 | 2/2018 | Kobayashi et al. |
| 9,925,801 | B2 | 3/2018 | Nakajima et al. |
| 9,981,486 | B2 | 5/2018 | Nakajima et al. |
| 10,029,483 | B2 | 7/2018 | Kobayashi et al. |
| 2001/0036978 | A1 | 11/2001 | Kohler et al. |
| 2003/0162868 | A1 | 8/2003 | Stretanski et al. |
| 2004/0075726 | A1 | 4/2004 | Hirai |
| 2004/0106700 | A1 | 6/2004 | Yamanouchi et al. |
| 2004/0132862 | A1* | 7/2004 | Woudenberg ........ C09D 11/101 523/160 |
| 2006/0050116 | A1 | 3/2006 | Nakajima |
| 2006/0203024 | A1 | 9/2006 | Kusunoki |
| 2007/0035594 | A1 | 2/2007 | Brooks et al. |
| 2007/0229612 | A1 | 10/2007 | Oyanagi et al. |
| 2008/0079792 | A1* | 4/2008 | Hirato ..................... B41J 2/175 347/92 |
| 2008/0165237 | A1 | 7/2008 | Yamauchi et al. |
| 2008/0166495 | A1 | 7/2008 | Maeno et al. |
| 2008/0199631 | A1 | 8/2008 | Makuta et al. |
| 2008/0218574 | A1 | 9/2008 | Furuno et al. |
| 2008/0238980 | A1 | 10/2008 | Nagashima et al. |
| 2008/0239045 | A1* | 10/2008 | Umebayashi ........ C09D 11/101 347/102 |
| 2008/0249795 | A1 | 10/2008 | Walker |
| 2008/0254234 | A1 | 10/2008 | Fink et al. |
| 2009/0000508 | A1 | 1/2009 | Edison et al. |
| 2009/0040249 | A1 | 2/2009 | Wouters et al. |
| 2009/0041946 | A1 | 2/2009 | Fukumoto et al. |
| 2009/0053484 | A1 | 2/2009 | Yoshihiro et al. |
| 2009/0068418 | A1 | 3/2009 | Iwase et al. |
| 2009/0099277 | A1 | 4/2009 | Nagvekar et al. |
| 2009/0118388 | A1 | 5/2009 | Naruse et al. |
| 2009/0145638 | A1 | 6/2009 | Toyoda et al. |
| 2009/0169834 | A1 | 7/2009 | Sano et al. |
| 2009/0197988 | A1 | 8/2009 | Kito et al. |
| 2009/0208651 | A1 | 8/2009 | Oyanagi et al. |
| 2009/0280302 | A1* | 11/2009 | Fukumoto ............ B41M 5/0023 428/195.1 |
| 2009/0289999 | A1 | 11/2009 | Takahashi et al. |
| 2009/0303304 | A1 | 12/2009 | Oyanagi et al. |
| 2010/0036978 | A1 | 2/2010 | Candelaria et al. |
| 2010/0073437 | A1 | 3/2010 | Shibata et al. |
| 2010/0079566 | A1 | 4/2010 | Ishikawa |
| 2010/0080925 | A1 | 4/2010 | Araki et al. |
| 2010/0112497 | A1 | 5/2010 | Takabayashi et al. |
| 2010/0313782 | A1 | 12/2010 | Loccufier et al. |
| 2010/0330296 | A1 | 12/2010 | Loccufier et al. |
| 2011/0015294 | A1 | 1/2011 | Kito et al. |
| 2011/0024392 | A1 | 2/2011 | Sato et al. |
| 2011/0028586 | A1 | 2/2011 | Kito et al. |
| 2011/0085013 | A1 | 4/2011 | Onishi et al. |
| 2011/0091790 | A1 | 4/2011 | Barnwell et al. |
| 2011/0124768 | A1 | 5/2011 | Claes et al. |
| 2011/0165387 | A1 | 7/2011 | Kondo |
| 2011/0234680 | A1 | 9/2011 | Aoyama et al. |
| 2011/0241264 | A1 | 10/2011 | Yokoi |
| 2012/0014005 | A1 | 1/2012 | Kliem |
| 2012/0026236 | A1 | 2/2012 | Fujii |
| 2012/0075394 | A1 | 3/2012 | Ohnishi |
| 2012/0083545 | A1 | 4/2012 | Kida et al. |
| 2012/0113201 | A1 | 5/2012 | Kagose et al. |
| 2012/0127249 | A1 | 5/2012 | Mizutaki et al. |
| 2012/0128890 | A1 | 5/2012 | Mirchev |
| 2012/0140005 | A1 | 6/2012 | De Voeght et al. |
| 2012/0147095 | A1 | 6/2012 | Miura et al. |
| 2012/0235414 | A1 | 9/2012 | Levy |
| 2012/0252919 | A1 | 10/2012 | Suzuki et al. |
| 2012/0274717 | A1 | 11/2012 | Nakano et al. |
| 2013/0002773 | A1 | 1/2013 | Fujii et al. |
| 2013/0010039 | A1 | 1/2013 | Kida et al. |
| 2013/0063535 | A1 | 3/2013 | Yoda et al. |
| 2013/0236654 | A1 | 9/2013 | Claes et al. |
| 2013/0250019 | A1 | 9/2013 | Sato et al. |
| 2013/0258016 | A1 | 10/2013 | Yoshida et al. |
| 2013/0258018 | A1 | 10/2013 | Nakajima et al. |
| 2013/0286120 | A1 | 10/2013 | Kobayashi et al. |
| 2013/0286121 | A1 | 10/2013 | Fukumoto et al. |
| 2014/0022321 | A1 | 1/2014 | Komatsu |
| 2014/0053753 | A1 | 2/2014 | Suzuki et al. |
| 2014/0063154 | A1 | 3/2014 | Gould et al. |
| 2014/0104356 | A1 | 4/2014 | Kitade et al. |
| 2014/0128496 | A1 | 5/2014 | Kida et al. |
| 2014/0132682 | A1 | 5/2014 | Kida et al. |
| 2014/0212634 | A1 | 7/2014 | Kameyama et al. |
| 2015/0050427 | A1 | 2/2015 | Claes et al. |
| 2015/0225581 | A1 | 8/2015 | Kida et al. |
| 2015/0240094 | A1 | 8/2015 | Kagose et al. |
| 2016/0001578 | A1 | 1/2016 | Kobayashi et al. |
| 2016/0046134 | A1 | 2/2016 | Fukumoto et al. |
| 2016/0152044 | A1 | 6/2016 | Yoshida et al. |
| 2017/0002221 | A1 | 1/2017 | Kida et al. |
| 2017/0087876 | A1 | 3/2017 | Nakajima et al. |
| 2018/0154658 | A1 | 6/2018 | Kobayashi et al. |
| 2018/0319177 | A1 | 11/2018 | Nakajima et al. |

FOREIGN PATENT DOCUMENTS

| | | |
|---|---|---|
| EP | 2 017 311 A1 | 1/2009 |
| EP | 2 266 812 A2 | 12/2010 |
| EP | 2 305 762 A1 | 4/2011 |
| EP | 2 335 940 A1 | 6/2011 |
| EP | 2 399 965 A1 | 12/2011 |
| EP | 2 399 966 A1 | 12/2011 |
| EP | 2 412 765 A1 | 2/2012 |
| EP | 2 543 707 A1 | 1/2013 |

(56) References Cited

FOREIGN PATENT DOCUMENTS

| | | |
|---|---|---|
| EP | 2 568 022 A2 | 3/2013 |
| JP | 60-208317 A | 10/1985 |
| JP | 60-210678 A | 10/1985 |
| JP | 2000-052596 A | 2/2000 |
| JP | 2000-169511 A | 6/2000 |
| JP | 2002-326976 A | 11/2002 |
| JP | 2003-089198 A | 3/2003 |
| JP | 2003-191593 A | 7/2003 |
| JP | 2003-200559 A | 7/2003 |
| JP | 2003-292855 A | 10/2003 |
| JP | 3461501 B1 | 10/2003 |
| JP | 2004-067991 A | 3/2004 |
| JP | 2004-098553 A | 4/2004 |
| JP | 2004-167873 A | 6/2004 |
| JP | 2004-196936 A | 7/2004 |
| JP | 2004182930 | 7/2004 |
| JP | 2004-224841 A | 8/2004 |
| JP | 2005-103854 A | 4/2005 |
| JP | 2005-170039 A | 6/2005 |
| JP | 2005-212412 A | 8/2005 |
| JP | 2005-214395 A | 8/2005 |
| JP | 2006-069025 A | 3/2006 |
| JP | 2006-152064 A | 6/2006 |
| JP | 2006-219625 A | 8/2006 |
| JP | 2006-231795 A | 9/2006 |
| JP | 2006-248042 A | 9/2006 |
| JP | 2006-257350 A | 9/2006 |
| JP | 2007-118409 A | 5/2007 |
| JP | 2007-136766 A | 6/2007 |
| JP | 2007-138070 A | 6/2007 |
| JP | 2007-185852 A | 7/2007 |
| JP | 2007-245630 A | 9/2007 |
| JP | 2007-283753 A | 11/2007 |
| JP | 2008-001003 A | 1/2008 |
| JP | 2008-001849 A | 1/2008 |
| JP | 2008-007687 A | 1/2008 |
| JP | 2008-055716 A | 3/2008 |
| JP | 2008-507598 A | 3/2008 |
| JP | 2008050600 | 3/2008 |
| JP | 2008-163080 A | 7/2008 |
| JP | 2008-179136 A | 8/2008 |
| JP | 2008-207425 A | 9/2008 |
| JP | 2008-246832 A | 10/2008 |
| JP | 2008-254196 A | 10/2008 |
| JP | 2008-254312 A | 10/2008 |
| JP | 2008-280383 A | 11/2008 |
| JP | 2008280383 A * | 11/2008 ................ B41J 2/01 |
| JP | 2009-000961 A | 1/2009 |
| JP | 4204333 B2 | 1/2009 |
| JP | 2009-035650 A | 2/2009 |
| JP | 2009-040880 A | 2/2009 |
| JP | 2009-057548 A | 3/2009 |
| JP | 2009-073945 A | 4/2009 |
| JP | 2009-096043 A | 5/2009 |
| JP | 2009-096910 A | 5/2009 |
| JP | 2009-146624 A | 7/2009 |
| JP | 2009-185157 A | 8/2009 |
| JP | 2009-191183 A | 8/2009 |
| JP | 4321050 B2 | 8/2009 |
| JP | 2009173853 | 8/2009 |
| JP | 4335955 B1 | 9/2009 |
| JP | 2009-235272 A | 10/2009 |
| JP | 2009-279830 A | 12/2009 |
| JP | 2009-279848 A | 12/2009 |
| JP | 2009-285853 A | 12/2009 |
| JP | 2009-292091 A | 12/2009 |
| JP | 2009-299057 A | 12/2009 |
| JP | 2010-012629 A | 1/2010 |
| JP | 2010-023285 A | 2/2010 |
| JP | 2010030110 | 2/2010 |
| JP | 2010-100833 A | 5/2010 |
| JP | 2010-131975 A | 6/2010 |
| JP | 2010-138315 A | 6/2010 |
| JP | 2010-143974 A | 7/2010 |
| JP | 2010-143982 A | 7/2010 |
| JP | 2010-167677 A | 8/2010 |
| JP | 2010-269471 A | 12/2010 |
| JP | 2010-280828 A | 12/2010 |
| JP | 2011-502188 A | 1/2011 |
| JP | 2011-025684 A | 2/2011 |
| JP | 2011-051107 A | 3/2011 |
| JP | 2011063778 | 3/2011 |
| JP | 2011-068013 A | 4/2011 |
| JP | 2011-083916 A | 4/2011 |
| JP | 2011-093156 A | 5/2011 |
| JP | 2011-098455 A | 5/2011 |
| JP | 2011-126269 A | 6/2011 |
| JP | 2011-132349 A | 7/2011 |
| JP | 2011-140197 | 7/2011 |
| JP | 2011-143344 A | 7/2011 |
| JP | 2011-523370 A | 8/2011 |
| JP | 2011-184609 A | 9/2011 |
| JP | 2011-184610 A | 9/2011 |
| JP | 2011-208018 A | 10/2011 |
| JP | 2011-213933 A | 10/2011 |
| JP | 2011-213934 A | 10/2011 |
| JP | 2011-219648 A | 11/2011 |
| JP | 2011-225848 A | 11/2011 |
| JP | 2011-235566 A | 11/2011 |
| JP | 2011-240565 A | 12/2011 |
| JP | 2012-000883 A | 1/2012 |
| JP | 2012-012478 A | 1/2012 |
| JP | 2012-020481 A | 2/2012 |
| JP | 2012-025124 A | 2/2012 |
| JP | 2012-046724 A | 3/2012 |
| JP | 2012046719 | 3/2012 |
| JP | 2012-072271 A | 4/2012 |
| JP | 2012-077221 A | 4/2012 |
| JP | 2012-077222 A | 4/2012 |
| JP | 2012-092291 A | 5/2012 |
| JP | 2012-126122 A | 7/2012 |
| JP | 2012-207084 A | 10/2012 |
| JP | 2013-010832 A | 1/2013 |
| JP | 2013-047305 A | 3/2013 |
| JP | 2013-053208 A | 3/2013 |
| JP | 5772032 B2 | 9/2015 |
| WO | 2006/085992 A2 | 8/2006 |
| WO | 2006/129476 A1 | 12/2006 |
| WO | 2007-083473 A1 | 7/2007 |
| WO | 2007/094446 A1 | 8/2007 |
| WO | 2007/126103 A1 | 11/2007 |
| WO | 2009/053305 A1 | 4/2009 |
| WO | 2010/029017 A1 | 3/2010 |
| WO | 2010/069758 A1 | 6/2010 |
| WO | 2011/039081 A1 | 4/2011 |
| WO | 2011/076703 A1 | 6/2011 |
| WO | 2012133694 | 10/2012 |
| WO | 2012/172973 A1 | 12/2012 |

OTHER PUBLICATIONS

U.S. Appl. No. 13/292,219, filed Nov. 9, 2011, Ultraviolet Curable Type Ink-Jet Ink Composition, Recording Method and Recording Apparatus Usisng Same.

U.S. Appl. No. 13/851,426, filed Mar. 27, 2013, Ink Jet Recording Method, Ultraviolet Curable Ink and Ink Jet Recording Apparatus.

U.S. Appl. No. 13/851,627, filed Mar. 27, 2013, Ink Jet Recording Method, Ultraviolet Curable Ink, and Ink Jet Recording Apparatus.

U.S. Appl. No. 13/853,120, filed Mar. 29, 2013, Ink Jet Recording Method, Ultraviolet-Ray Curable Ink, and Ink Jet Recording Apparatus.

U.S. Appl. No. 13/853,185, filed Mar. 29, 2013, Ink Jet Recording Method and Ink Jet Recording Apparatus.

U.S. Appl. No. 14/081,281, filed Nov. 15, 2013, UV Curable Ink Jet Recording Ink Composition, Ink Container and Ink Jet Recording Apparatus.

U.S. Appl. No. 14/155,588, filed Jan. 15, 2014, Ultraviolet-Curable Ink Jet Ink Composition.

U.S. Appl. No. 14/689,502, filed Apr. 17, 2015, Ultraviolet-Curable Ink Jet Ink Composition.

U.S. Appl. No. 14/708,325, filed May 11, 2015, Ultraviolet Curable Type Ink-Jet Ink Composition, Recording Method and Recording Apparatus Using the Same.

(56) References Cited

OTHER PUBLICATIONS

U.S. Appl. No. 14/856,092, filed Sep. 16, 2015, Ink Jet Recording Method, Ultraviolet-Ray Curable Ink, and Ink Jet Recording Apparatus.
U.S. Appl. No. 14/920,966, filed Oct. 23, 2015, Ink Jet Recording Method and Ink Jet Recording Apparatus.
U.S. Appl. No. 15/014,361, filed Feb. 3, 2016, Ink Jet Recording Method, Ultraviolet Curable Ink and Ink Jet Recording Apparatus.
U.S. Appl. No. 15/269,319, filed Sep. 19, 2016, UV Curable Ink Jet Recording Ink Composition, Ink Container and Ink Jet Recording Apparatus.
U.S. Appl. No. 15/373,390, filed Dec. 8, 2016, Ink Jet Recording Method, Ultraviolet Curable Ink, and Ink Jet Recording Apparatus.
U.S. Appl. No. 15/991,316, filed May 29, 2018, Ink Jet Recording Method, Ultraviolet Curable Ink, and Ink Jet Recording Apparatus.
**[No Author Listed] BASF Product Brochure (no date available), Coatings that stay looking good: BASF performance additive. (online) Retrieved by examiner Jun. 26, 2014, <URL: http://www.basf.com/group/corporate/us/en/literature-document:Brand+Chimassorb-Brochure--Coatings+that+stay+looking+good+BASF+performance+additives-English.pdf>, 32 pages.
**Green, W.A., Commercial photoinitiators, Chapter 4, Industrial Photoinitiators, A Technical Guide. CRC Press, Taylor & Francis Group, 2010, pp. 75-114.
**Keskin et al., "2-Mercaptothioxanthone as sensitizers and coinitiators for acylphosphine oxide photoinitiators for free radical polymerization," Macromolecules, 2008, v. 41, pp. 4631-4634.

* cited by examiner

INK JET RECORDING METHOD AND INK JET RECORDING APPARATUS

CROSS REFERENCE TO RELATED APPLICATIONS

This application is a continuation of U.S. patent application Ser. No. 13/853,185, filed on Mar. 29, 2013, and claims priority to Japanese Patent Application Nos. JP 2012-102535 filed on Apr. 27, 2012 and JP 2012-250029 filed on Nov. 14, 2012, all of which are hereby incorporated by reference in their entirety.

BACKGROUND

1. Technical Field

The present invention relates to an ink jet recording method and an ink jet recording apparatus.

2. Related Art

In the related art, various methods are used as a recording method of forming an image on a recording medium such as paper based on image data signals. Among these methods, when an ink jet method is used, ink can be discharged onto only a desired image portion of a recording medium with an inexpensive apparatus and an image is directly formed on the recording medium. Therefore, ink can be efficiently used and running cost is low. Furthermore, little noise is made in the ink jet method, which is superior as a recording method.

Recently, an ink jet recording method using a photocurable ink in which monomers are photopolymerized (cured) by irradiation of light has been disclosed. With this ink jet method, an image having superior water resistance and wear resistance can be formed on a recording surface of a recording medium. Therefore, this ink jet method is used for manufacture of a color filter; printing (recording) on a printed circuit board, a plastic card, a plastic sheet, a large-sized signboard, and a plastic component; and printing of a barcode or a date.

For example, Japanese Patent No. 4335955 discloses an energy ray-curable ink composition including a coloring material, a polymerizable compound, a photopolymerization initiator, and a surface conditioner. In the ink composition, the polymerizable compound consists only of a monofunctional monomer having an acrylic equivalent of 300 or less, and having one ethylenic double bond in one molecule, and a polyfunctional monomer having an acrylic equivalent of 150 or less, and having two or more ethylenic double bonds in one molecule; the photopolymerization initiator contains an α-aminoalkylphenone compound and a thioxanthone compound; and the surface conditioner contains a silicone compound having a polydimethylsiloxane structure. In addition, Japanese Patent No. 4335955 also discloses the sentence "since the ink composition contains the polymerizable compound consisting only of a monofunctional monomer having an acrylic equivalent of 300 or less and a polyfunctional monomer having an acrylic equivalent of 150 or less, a highly reactive ink composition which has a low viscosity suitable for an ink jet recording system can be obtained" (paragraphs [0006] and [0007] of Japanese Patent No. 4335955).

However, when ink jet recording is performed using the energy ray-curable ink composition disclosed in Japanese Patent No. 4335955, there are problems in that curability and discharge stability deteriorate; and that image quality stability deteriorates due to a significant increase in the internal temperature of a recording apparatus after continuous printing (continuous discharge).

SUMMARY

An advantage of some aspects of the invention is to provide an ink jet recording method which has effects of obtaining superior curability and discharge stability; and suppressing an increase in the internal temperature of a recording apparatus after continuous printing.

The present inventors have thoroughly studied, thereby obtaining the following findings. When a photocurable ink containing a polymerizable compound is irradiated with light, the polymerizable compound is photopolymerized and the photocurable ink is fixed (cured). At this time, the photopolymerization generates reaction heat. However, in the energy ray-curable ink composition disclosed in Japanese Patent No. 4335955, in order to obtain a highly reactive ink having a low viscosity, the acrylic equivalent of the polymerizable compound, which is one component, is specified. However, since the acrylic equivalent of the entire ink composition is not specified, reaction heat generated during the curing of ink is not considered. Accordingly, when ink jet recording is performed using the ink composition disclosed in Japanese Patent No. 4335955, the amount of reaction heat is increased over time, the internal temperature of an ink jet recording apparatus is significantly increased, and thus the viscosity of the ink composition is changed when being discharged. As a result, ink application positions or the amount of ink discharged may be changed and thus the image quality of an obtained image is not stable in terms of graininess, hue, and the like. As described above, when the ink composition disclosed in Japanese Patent No. 4335955 is used for a relatively long-period recording such as continuous printing, it is difficult to satisfy superior curability and discharge stability at the same time and to perform recording.

The present inventors have repeatedly discussed about the above-described reaction heat, thereby obtaining the following findings. First, in order to suppress the amount of reaction heat, it is necessary that the viscosity of an ink be increased. To that end, it is necessary that an ink discharged from a head be heated to increase the temperature of the ink discharged from the head (hereinafter, also referred to as a "discharge temperature"). However, in this case, there is a problem in that the internal temperature of an ink jet recording apparatus is significantly increased. On the other hand, when the viscosity of an ink is reduced in order to suppress the heating temperature of the ink discharged from the head to a relatively low degree, the amount of reaction heat generated during curing is increased. This case also has a problem in that the internal temperature of the ink jet recording apparatus is significantly increased.

Based on the above-described findings, the present inventors have thoroughly discussed about the problems caused by the reaction heat and found that high-quality images could be stably obtained by stably maintaining the internal temperature, in particular, the discharge temperature of an ink jet recording apparatus at a relatively low temperature. Specifically, it was found that the amount of reaction heat generated during curing could be sufficiently suppressed by maintaining the discharge temperature in a range of 30° C. to 40° C. Furthermore, in order to obtain superior curability and discharge stability at the same time in an ink jet recording method, the present inventors have repeatedly discussed about a reduction in the viscosity of an ink. As a result, the present inventors found that the above-described problems could be solved using an ink jet recording method including: discharging an ultraviolet ray-curable ink, which has a viscosity at 20° C. of 25 mPa·s or less and an average equivalent of polymerizable unsaturated double bond of 100 to 150, from a head onto a recording medium at a discharge temperature of 30° C. to 40° C.; and irradiating the ultraviolet ray-curable ink, attached onto the recording medium, with ultraviolet rays emitted from a light source to cure the ultraviolet ray-curable ink, thereby completing the invention.

That is, the invention has adopted the following means.

[1] An ink jet recording method including: discharging an ultraviolet ray-curable ink, which has a viscosity at 20° C. of 25 mPa·s or less and an average equivalent of polymerizable unsaturated double bond of 100 to 150, from a head onto a recording medium at a discharge temperature of 30° C. to 40° C.; and irradiating the ultraviolet ray-curable ink, attached onto the recording medium, with ultraviolet rays emitted from a light source to cure the ultraviolet ray-curable ink.

[2] The ink jet recording method according to [1], wherein the head is a line head having a length longer than or equal to a width of the recording medium, and recording is performed using a line type ink jet recording apparatus that discharges the ultraviolet ray-curable ink from the line head onto the recording medium which is scanned relative to the line head.

[3] The ink jet recording method according to [1] or [2], wherein a support supports the recording medium, moves along with the transport of the recording medium, and passes through a position opposite the head, and a time period in which the support moves from a position and returns to the position is longer than or equal to 5 seconds.

[4] The ink jet recording method according to [3], wherein a material of the support for the recording medium is a metal.

[5] The ink jet recording method according to any one of [1] to [4], wherein a viscosity at 20° C. of the ultraviolet ray-curable ink is 15 mPa·s to 25 mPa·s.

[6] The ink jet recording method according to any one of [1] to [5], wherein the light source is a light emitting diode.

[7] The ink jet recording method according to any one of [1] to [6], wherein the ultraviolet ray-curable ink contains 30% by mass to 70% by mass of monofunctional (meth) acrylate and 20% by mass to 60% by mass of bifunctional or higher polyfunctional (meth)acrylate.

[8] The ink jet recording method according to any one of [1] to [7], wherein the ultraviolet ray-curable ink is curable by irradiation of ultraviolet rays having an irradiation energy of 200 mJ/cm$^2$ or lower.

[9] An ink jet recording apparatus which performs recording using the ink jet recording method according to any one of [1] to [8].

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
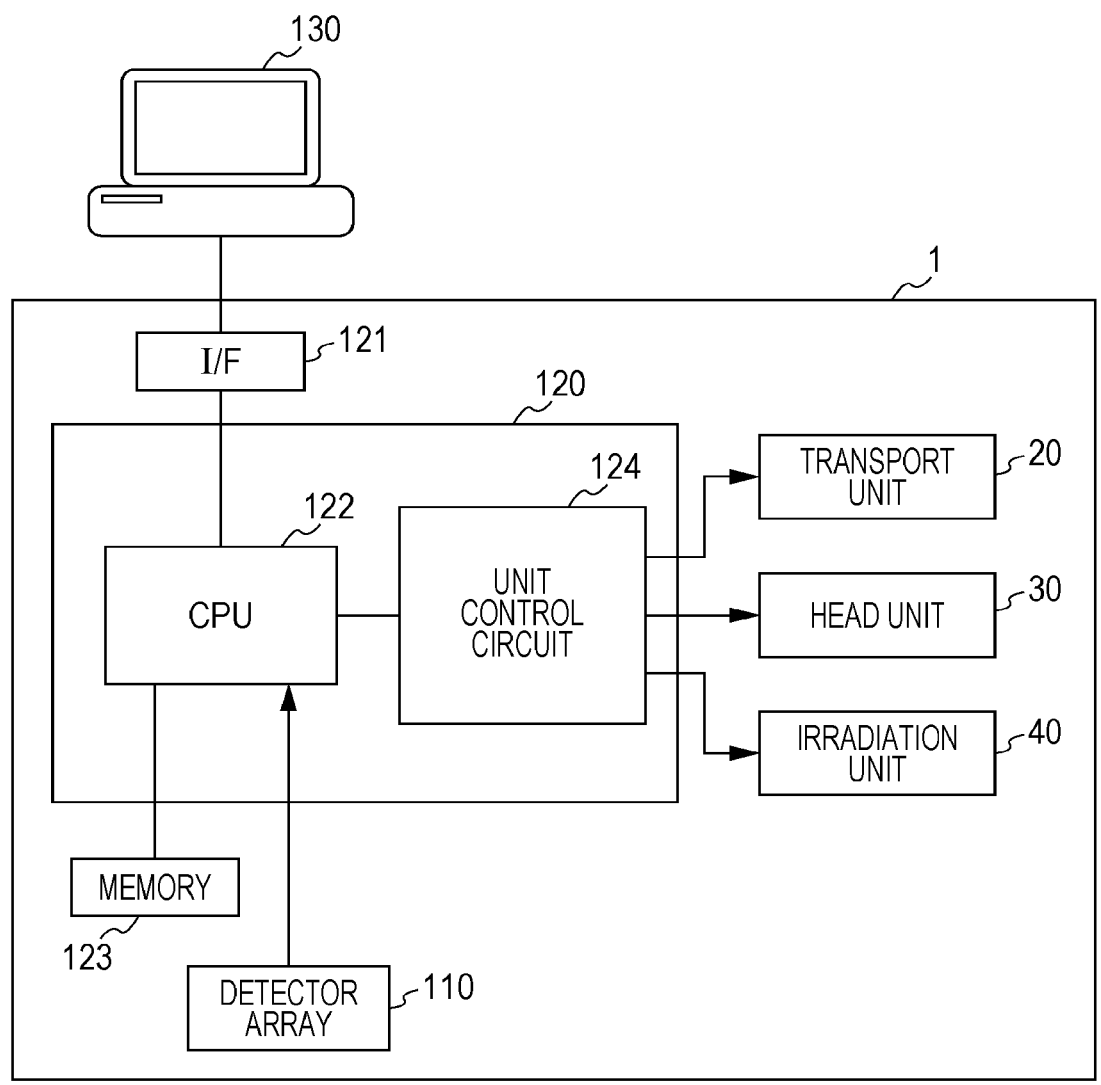
FIG. 1 is a block diagram illustrating a configuration example of an ink jet recording apparatus according to an embodiment of the invention.

Hereinafter, embodiments of the invention will be described in detail.

In the specification, "recorded material" refers to a recording medium on which a cured material is formed using an ink. The cured material described in this specification refers to a cured material containing a cured film or a coating film.

In addition, in this specification, "curing" refers to irradiating an ink containing a polymerizable compound with light to polymerize the polymerizable compound and to fix the ink. "Curability" refers to the property of being cured in response to light; and is also called "photopolymerizability". "Curing wrinkles" refers to wrinkles that are generated on a surface of a coating film after curing, as a result of a high volumetric polymerization shrinkage increased, for example, when an uncured ink in a coating film, which is a target for curing, irregularly flows before curing.

In addition, in the specification, "discharge stability" refers to the property of continuously stably discharging ink droplets from nozzles without nozzle clogging.

In addition, in this specification, "storage stability" refers to the property of a viscosity of an ink being not easily changed before and after the ink is stored. "wear resistance" refers to the property of a cured material being not easily peeled off or worn off when being rubbed.

In addition, in this specification, "(meth)acrylate" represents at least one of acrylate and corresponding methacrylate; "(meth)acryl" represents at least one of acryl and corresponding methacryl; and "(meth)acryloyl" represents at least one of acryloyl and corresponding methacryloyl.

Ink Jet Recording Method

An embodiment of the invention relates to an ink jet recording method (hereinafter, also simply referred to as a "recording method"). The recording method includes at least a discharging step of discharging an ultraviolet ray-curable ink, which has a viscosity at 20° C. in a predetermined range and an average equivalent of polymerizable unsaturated double bond in a predetermined range, from a head onto a recording medium at a discharge temperature in a predetermined range; and a curing step of irradiating the ultraviolet ray-curable ink, attached onto the recording medium, with ultraviolet rays emitted from a light source to cure the ultraviolet ray-curable ink. In this way, the ultraviolet ray-curable ink is cured and a cured material thereof is formed on a recording medium.

Hereinafter, first, the ultraviolet ray-curable ink (hereinafter also referred to as an "ink" or an "ink composition") will be described in detail, and then the respective steps included in the recording method will be described.

The ultraviolet ray-curable ink according to the embodiment can be used for the above-described ink jet recording method and an ink jet recording apparatus described below. As described above, the ultraviolet ray-curable ink has a viscosity at 20° C. and an average equivalent of polymerizable unsaturated double bond in the predetermined ranges, respectively.

1. Viscosity at 20° C. of Ultraviolet Ray-Curable Ink

The viscosity at 20° C. of the ultraviolet ray-curable ink is less than or equal to 25 mPa·s, preferably 15 mPa·s to 25 mPa·s, and more preferably 17 mPa·s to 23 mPa·s. When the viscosity at 20° C. is less than or equal to the above-described upper limit, the ink discharge stability is superior.

When the viscosity at 20° C. is greater than or equal to the above-described lower limit, curing wrinkles can be effectively suppressed.

As described below in Examples, the viscosity of the ink according to the embodiment can be measured using an E-type viscometer. When the E-type viscometer is used, the fact that the measurement should be performed according to the instruction manual belongs to the common knowledge. Accordingly, needless to say, the kinds and rotating speed of a rotor should be set according to the instruction manual such that the viscosity of the ink, which is a measurement target, can be measured normally. Therefore, it is also apparent that, in this embodiment, measurement conditions are set according to the instruction manual such that the viscosity of the ink, which is a measurement target, can be normally measured normally.

The reason why curing wrinkles are generated is assumed to be as follows, but the scope of the embodiment is not limited to this assumption. It is assumed that curing wrinkles are generated in the following cases: in a coating film of the ink, when a surface of the coating film is cured first and then the inside of the coating film is cured, the surface of the coating film which is cured first may be deformed; and the ink in the coating film may irregularly flow before curing the inside of the coating film. In addition, an ultraviolet ray-curable ink having a low viscosity has a tendency to have a large polymerization shrinkage when being cured (the difference between a volume of an ink having a predetermined mass before curing and a volume of the ink (cured material) after curing). For this reason, it is assumed that curing wrinkles are significantly generated. In addition, an ultraviolet ray-curable ink, which contains a monofunctional (meth)acrylate described below, in particular, a vinyl ether group-containing (meth)acrylate represented by a formula (I) described below, has a tendency that curing wrinkles are likely to be generated. In particular, in an ultraviolet ray-curable ink, which contains the vinyl ether group-containing (meth)acrylic acid ester represented by the formula (I) and has a low viscosity, it is assumed that curing wrinkles are significantly generated. In the case of an ultraviolet ray-curable ink used in the ink jet recording method according to the embodiment, even when the ink contains the above-described (meth)acrylate, curing wrinkles can be effectively suppressed by setting the viscosity of the ink in the above-described range. In this specification, as the viscosity, values measured according to the method used in Examples below can be used.

An example of an ink design method for setting the viscosity of the ink in a desired range will be described.

The viscosity of a mixture of polymerizable compounds included in the ink can be calculated from the viscosity of each polymerizable compound used and the mass ratio of the polymerizable compound to the ink composition.

It is assumed that an ink contains N kinds of polymerizable compounds A, B, . . . , N. The viscosity of the polymerizable compound A is represented by VA, and the mass ratio of the polymerizable compound A to the total amount of all the polymerizable compounds in the ink is represented by MA. The viscosity of the polymerizable compound B is represented by VB, and the mass ratio of the polymerizable compound B to the total amount of all the polymerizable compounds in the ink is represented by MB. Likewise, the viscosity of the polymerizable compound N is represented by VN, and the mass ratio of the polymerizable compound N to the total amount of all the polymerizable compounds in the ink is represented by MN. Specifically, the expression "MA+MB+ . . . +MN=1" is satisfied. In addition, the viscosity of a mixture of all the polymerizable compounds included in the ink is represented by VX. In this case, it is assumed that the following expression (1) is satisfied.

$$MA \times \text{Log } VA + MB \times \text{Log } VB + \ldots + MN \times \text{Log } VN = \text{Log } VX \quad (1)$$

For example, when the ink contains two kinds of polymerizable compounds, the mass ratios of the polymerizable compounds after MB are set to zero. The number of kinds of polymerizable compounds can be set to an arbitrary number of 1 or more.

An example of a procedure (Steps 1 to 7) for setting the viscosity of the ink in a desired range will be described.

First, information regarding the viscosity at a predetermined temperature of each polymerizable compound to be used is acquired (Step 1). For example, the information can be acquired from a manufacturer catalog or the like; or can be acquired by measuring the viscosity of each polymerizable compound at a predetermined temperature. The viscosity of a single polymerizable compound may vary depending on manufacturers even when the same kind of polymerizable compound is used. Therefore, it is preferable that the viscosity information be acquired from a manufacturer of a polymerizable compound to be used.

Next, VX is set to a target viscosity, and the composition ratio (mass ratio) of each polymerizable compound is determined based on the expression (1) such that VX is the target viscosity (Step 2). The target viscosity is the viscosity of a finally obtained ink composition and is in a range of, for example, 15 mPa·s to 25 mPa·s. The predetermined temperature is set to 20° C.

Next, polymerizable compounds are actually mixed with each other to prepare a composition of the polymerizable compounds (hereinafter, also referred to as a "polymerizable composition), and then the viscosity thereof at a predetermined temperature is measured (Step 3).

When the viscosity of the polymerizable composition approximately approaches the above-described target viscosity (In Step 4, "target viscosity±5 mPa·s" is allowable), an ink composition that contains the polymerizable composition and components other than polymerizable compounds such as a photopolymerization initiator and a pigment (hereinafter, also referred to as "components other than polymerizable compounds") is prepared, and the viscosity of the ink composition is measured (Step 4). In Step 4, among the components other than the polymerizable, for example, when a composition is added to the ink composition in the form of a pigment dispersion as in the case of a pigment, polymerizable compounds which are contained in the pigment dispersion in advance are also added to the ink composition. Therefore, it is necessary that the mass ratio of each polymerizable compound in the ink composition be adjusted to a value obtained by subtracting the mass ratio of each polymerizable compound, added to the ink composition in the form of the pigment dispersion, from the composition ratio of each polymerizable compound determined in step 2.

Next, a difference between the measured viscosity of the ink composition and the measured viscosity of the polymerizable composition is calculated and is set to VY (Step 5). Usually, "VY>0" is satisfied. VY depends on containing conditions such as the kind and content of the components other than polymerizable compounds. In Examples below, VY=3 mPa·s to 5 mPa·s.

Next, VX is set to a value of "target viscosity of Step 2—VY", and the composition ratio of each polymerization compound is determined again based on the expression (1) such that VX is the value of "target viscosity of Step 2—VY" (Step 6).

Next, polymerization compounds having the composition ratios determined in Step 6 are mixed with components other than polymerizable compounds to prepare an ink composition, and the viscosity thereof at a predetermined temperature is measured (Step 7). When the measured viscosity is the target viscosity, the ink composition prepared in Step 7 is the ink composition having the target viscosity.

On the other hand, in Step 3 when the measured viscosity of the prepared composition of polymerizable compounds is out of the range of "target viscosity±5 mPa·s", the following fine adjustment is performed. Then, the process is repeated from Step 3. First, when the measured viscosity is too high, the content of a polymerizable compound having a higher viscosity than the target viscosity is reduced; and the content of a polymerizable compound having a lower viscosity than the target viscosity is increased. On the other hand, when the measured viscosity is too low, the content of a polymerizable compound having a lower viscosity than the target viscosity is reduced; and the content of a polymerizable compound having a higher viscosity than the target viscosity is increased. In addition, in Step 7, when the measured viscosity of the prepared ink composition is not the target viscosity, the same adjustment as the above-described fine adjustment is performed. Then, the process is repeated from Step 7.

2. Average Equivalent of Polymerizable Unsaturated Double Bond of Ultraviolet Ray-Curable Ink The ultraviolet ray-curable ink has an average equivalent of polymerizable unsaturated double bond of 100 to 150, preferably 110 to 150, and more preferably 120 to 150. When the average equivalent of polymerizable unsaturated double bond is greater than or equal to the above-described lower limit, the amount of reaction heat generated during curing is suppressed. Therefore, an increase in temperature after continuous printing can be suppressed and storage stability is superior. In addition, when the average equivalent of polymerizable unsaturated double bond is less than or equal to the above-described upper limit, curability is superior.

A compound having a polymerizable unsaturated double bond can be referred to as a compound having a polymerizable functional group which contains a polymerizable unsaturated double bond. Examples thereof include (meth) acrylate compounds, vinyl compounds, vinyl ether compounds, and allyl compounds. However, the compound is not limited to these examples. The compound having a polymerizable unsaturated double bond is not particularly limited as long as it has one or more polymerizable functional groups. When the number of polymerizable functional groups is more than or equal to 2, the kinds of the polymerizable functional groups may be the same as or different from each other. In addition, based on a structure thereof other than the above-described polymerizable functional group, the above-described compound can be divided into polymerizable compounds having an aromatic ring structure, polymerizable compounds having a cyclic or linear aliphatic structure, and polymerizable compounds having a heterocyclic structure.

In this specification, the average equivalent of polymerizable unsaturated double bond of the ultraviolet ray-curable ink can be measured as follows. First, the equivalent of polymerizable unsaturated double bond of each polymerizable compound included in the ink is calculated according to the following expression (2).

$$\text{Equivalent of Polymerizable Unsaturated Double Bond of Polymerizable Compound} = \text{Molecular Weight of Polymerizable Compound/Number of Polymerizable Unsaturated Double Bonds Included in Molecules of Polymerizable Compound} \quad (2)$$

In the expression (2), the molecular weight of a polymerizable compound and the number of polymerizable unsaturated double bonds can be acquired from values of a manufacturer catalog or values calculated from a chemical structural formula thereof.

Next, the average equivalent of polymerizable unsaturated double bond of the ink is calculated according to the following expression (3).

$$\text{Average Equivalent of Polymerizable Unsaturated Double Bond of Ink} = (\text{Equivalent of Polymerizable Unsaturated Double Bond of Polymerizable Compound } A \times \text{Content of Polymerizable Compound } A \text{ in Ink} + \text{Equivalent of Polymerizable Unsaturated Double Bond of Polymerizable Compound } B \times \text{Content of Polymerizable Compound } B \text{ in Ink} \ldots \text{Equivalent of Polymerizable Unsaturated Double Bond of Polymerizable Compound } n \times \text{Content of Polymerizable Compound } n \text{ in Ink})/(\text{Content of Polymerizable Compound } A \text{ in Ink} + \text{Content of Polymerizable Compound } B \text{ in Ink} + \ldots + \text{Content of Polymerizable Compound } n \text{ in Ink}) \quad (3)$$

The expression (3) is under the assumption that the ink contains n kinds of polymerizable compounds in which "n" represents an integer of 1 or more. In the expression (3), "content" is represented by % by mass with respect to the total mass of the ink.

As the average equivalent of polymerizable unsaturated double bond of the ink is lower, the ink contains more polymerizable unsaturated double bonds, and the amount of reaction heat generated during the polymerization of the ink is increased. On the other hand, as the average equivalent of polymerizable unsaturated double bond of the ink is higher, the ink contains less polymerizable unsaturated double bonds, and the amount of reaction heat generated during the polymerization of the ink is reduced.

Hereinafter, additives (components) which can be added to the ultraviolet ray-curable ink according to the embodiment will be described.

3. Polymerizable Compound

A polymerizable compound included in the ink can be polymerized alone or along with the reaction of a photopolymerization initiator by irradiation of light to cure the printed ink. As the polymerizable compound, various kinds of monofunctional, bifunctional, and trifunctional or higher polyfunctional monomers and oligomers can be used. Examples of the monomers include unsaturated carboxylic acids such as (meth)acrylic acid, itaconic acid, crotonic acid, isocrotonic acid, and maleic acid and salts or esters thereof; urethanes; amides and anhydrides thereof; acrylonitriles; styrenes; and various kinds of unsaturated polyesters, unsaturated polyethers, unsaturated polyamides, and unsaturated urethanes. In addition, examples of the oligomers include oligomers derived from the monomers such as a linear acryl oligomer; epoxy (meth)acrylate; oxetane (meth) acrylate; cyclic or linear aliphatic urethane (meth)acrylate; aromatic urethane (meth)acrylate; and polyester (meth)acrylate.

Among these, (meth)acrylic acid esters, that is, (meth) acrylates are preferable. Among the (meth)acrylates, it is preferable that a monofunctional (meth)acrylate and a bifunctional or higher polyfunctional (meth)acrylate be used in combination; and it is more preferable that a monofunctional (meth)acrylate and a bifunctional polyfunctional (meth)acrylate be used in combination.

Hereinafter, the polymerizable compound will be described in detail focusing on (meth)acrylate. Among the above-described monofunctional (meth)acrylates, for example, a vinyl ether group-containing (meth)acrylic acid ester represented by the formula (I) are preferably used. Therefore, first, the vinyl ether group-containing (meth) acrylic acid ester will be described.

3-1. Vinyl Ether Group-Containing (Meth)Acrylic Acid Ester

It is preferable that the ink contain a vinyl ether group-containing (meth)acrylic acid ester represented by the formula (I).

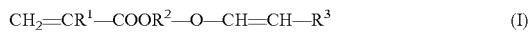

$$CH_2=CR^1-COOR^2-O-CH=CH-R^3 \qquad (I)$$

(wherein $R^1$ represents a hydrogen atom or a methyl group; $R^2$ represents a divalent organic residue having 2 to 20 carbon atoms; and $R^3$ represents a hydrogen atom or a monovalent organic residue having 1 to 11 carbon atoms)

When the ink contains the vinyl ether group-containing (meth)acrylic acid ester, the viscosity of the ink can be reduced, the curability of the ink can be improved, and curing wrinkles can be effectively suppressed. Furthermore, a case of using a compound having both a vinyl ether group and a (meth)acrylic group in one molecule is more preferable to a case of separately using a compound having a vinyl ether group and a compound having a (meth)acrylic group, from the viewpoint of improving the curability of the ink.

In the formula (I), preferable examples of the divalent organic residue having 2 to 20 carbon atoms represented by $R^2$ include an linear, branched, or cyclic alkylene group having 2 to 20 carbon atoms which may be substituted; an alkylene group having 2 to 20 carbon atoms and having an oxygen atom of an ether bond or an ester bond in a structure thereof which may be substituted; and a divalent aromatic group having 6 to 11 carbon atoms which may be substituted. Among these, an alkylene group having 2 to 6 carbon atoms such as an ethylene group, an n-propylene group, an isopropylene group, or a butylene group; and an alkylene group having 2 to 9 carbon atoms and an oxygen atom of an ether bond in a structure thereof such as an oxyethylene group, an oxy-n-propylene group, an oxyisopropylene group, or an oxybutylene group are preferably used.

In the formula (I), preferable examples of the monovalent organic residue having 1 to 11 carbon atoms represented by $R^3$ include a linear, branched, or cyclic alkyl group having 1 to 10 carbon atoms which may be substituted; and an aromatic group having 6 to 11 carbon atoms which may be substituted. Among these, an alky group having 1 or 2 carbon atoms such as a methyl group or an ethyl group; and an aromatic group having 6 to 8 carbon atoms such as a phenyl group or a benzyl group are preferably used.

When each organic residue described above is a groups which may be substituted, examples of a substituent thereof are divided into a group having carbon atoms and a group not having carbon atoms. First, when the substituent is a group having carbon atoms, the number of the carbon atoms corresponds to the number of carbon atoms contained in the organic residue. Examples of the group having carbon atoms include a carboxylic group and an alkoxy group, but the group having carbon atoms is not limited thereto. Next, examples of the group not having carbon atoms include a hydroxyl group and a halo group, but the group not having carbon atoms is not limited thereto.

Examples of the vinyl ether group-containing (meth) acrylic acid ester include 2-vinyloxyethyl (meth)acrylate, 3-vinyloxypropyl (meth)acrylate, 1-methyl-2-vinyloxyethyl (meth) acrylate, 2-vinyloxypropyl (meth)acrylate, 4-vinyloxybutyl (meth)acrylate, 1-methyl-3-vinyloxypropyl (meth) acrylate, 1-vinyloxymethylpropyl (meth) acrylate, 2-methyl-3-vinyloxypropyl (meth) acrylate, 1,1-dimethyl-2-vinyloxyethyl (meth) acrylate, 3-vinyloxybutyl (meth)acrylate, 1-methyl-2-vinyloxypropyl (meth)acrylate, 2-vinyloxybutyl (meth) acrylate, 4-vinyloxycyclohexyl (meth) acrylate, 6-vinyloxyhexyl (meth)acrylate, 4-vinyloxymethylcyclohexylmethyl (meth) acrylate, 3-vinyloxymethylcyclohexylmethyl (meth) acrylate, 2-vinyloxymethylcyclohexylmethyl (meth) acrylate, p-vinyloxymethylphenylmethyl (meth) acrylate, m-vinyloxymethylphenylmethyl (meth) acrylate, o-vinyloxymethylphenylmethyl (meth) acrylate, 2-(vinyloxyethoxy)ethyl (meth) acrylate, 2-(vinyloxyisopropoxy)ethyl (meth) acrylate, 2-(vinyloxyethoxy)propyl (meth) acrylate, 2-(vinyloxyethoxy) isopropyl (meth) acrylate, 2-(vinyloxyisopropoxy)propyl (meth)acrylate, 2-(vinyloxyisopropoxy) isopropyl (meth)acrylate, 2-(vinyloxyethoxyethoxy)ethyl (meth) acrylate, 2-(vinyloxyethoxyisopropoxy)ethyl (meth) acrylate, 2-(vinyloxyisopropoxyethoxy)ethyl (meth)acrylate, 2-(vinyloxyisopropoxyisopropoxy)ethyl (meth)acrylate, 2-(vinyloxyethoxyethoxy)propyl (meth) acrylate, 2-(vinyloxyethoxyisopropoxy)propyl (meth)acrylate, 2-(vinyloxyisopropoxyethoxy)propyl (meth)acrylate, 2-(vinyloxyisopropoxyisopropoxy)propyl (meth)acrylate, 2-(vinyloxyethoxyethoxy)isopropyl (meth)acrylate, 2-(vinyloxyethoxyisopropoxy)isopropyl (meth)acrylate, 2-(vinyloxyisopropoxyethoxy)isopropyl (meth)acrylate, 2-(vinyloxyisopropoxyisopropoxy)isopropyl (meth)acrylate, 2-(vinyloxyethoxyethoxyethoxy)ethyl (meth)acrylate, 2-(vinyloxyethoxyethoxyethoxyethoxy)ethyl (meth)acrylate, 2-(isopropenoxyethoxy)ethyl (meth) acrylate, 2-(isopropenoxyethoxyethoxy)ethyl (meth) acrylate, 2-(isopropenoxyethoxyethoxyethoxy)ethyl (meth)acrylate, 2-(isopropenoxyethoxyethoxyethoxyethoxy)ethyl (meth) acrylate, polyethylene glycol monovinyl ether (meth)acrylate, and polypropylene glycol monovinyl ether (meth) acrylate. However, the vinyl ether group-containing (meth) acrylic acid ester is not limited thereto.

Among these, from the viewpoints of reducing the viscosity of the ink, increasing the flash point, and improving the curability of the ink, 2-(vinyloxyethoxy)ethyl (meth) acrylate, that is, at least one of 2-(vinyloxyethoxy)ethyl acrylate and 2-(vinyloxyethoxy)ethyl methacrylate is preferable; and 2-(vinyloxyethoxy)ethyl acrylate is more preferable. In particular, both 2-(vinyloxyethoxy)ethyl acrylate and 2-(vinyloxyethoxy)ethyl methacrylate have a simple structure and a low molecular weight, the viscosity of the ink can be significantly reduced. Examples of 2-(vinyloxyethoxy)ethyl (meth)acrylate include 2-(2-vinyloxyethoxy) ethyl (meth)acrylate and 2-(1-vinyloxyethoxy) (meth)acrylate. Examples of 2-(vinyloxyethoxy)ethyl acrylate include 2-(2-vinyloxyethoxy)ethyl acrylate and 2-(1-vinyloxyethoxy) acrylate. 2-(vinyloxyethoxy)ethyl acrylate is superior to 2-(vinyloxyethoxy)ethyl methacrylate from the viewpoints of curability.

As the vinyl ether group-containing (meth)acrylic acid ester, one kind may be used alone or two or more kinds may be used in combination.

Examples of a method of preparing the vinyl ether group-containing (meth)acrylic acid ester include a method (preparation method B) of esterifying (meth)acrylic acid with hydroxyl group-containing vinyl ether, a method (preparation method C) of esterifying (meth)acrylic acid halide with hydroxyl group-containing vinyl ether, a method (preparation method D) of esterifying (meth)acrylic anhydride with hydroxyl group-containing vinyl ether, a method (preparation method E) of ester-exchanging (meth)acrylate with hydroxyl group-containing vinyl ether, a method (preparation method F) of esterifying (meth)acrylic acid with halogen-containing vinyl ether, a method (preparation method G) of esterifying (meth)acrylic acid alkali (earth) metal salt with halogen-containing vinyl ether, a method (preparation method H) of vinyl-exchanging hydroxyl group-containing (meth)acrylate with vinyl carboxylate, and a method (preparation method I) of ether-exchanging hydroxyl group-containing (meth)acrylate with alkyl vinyl ether. However, the method of preparing vinyl ether group-containing (meth) acrylic acid ester is not limited thereto.

Among these methods, the preparation method E is preferable from the viewpoint of obtaining superior desired effects of the embodiment.

3-2. Monofunctional (Meth)acrylate

It is preferable that the ink contain a monofunctional (meth)acrylate. When the ink contains the above-described vinyl ether group-containing (meth)acrylic acid ester (which is limited to a monofunctional (meth)acrylate), the above-described monofunctional (meth)acrylate includes the vinyl ether group-containing (meth)acrylic acid ester. The description of the vinyl ether group-containing (meth)acrylic acid ester will not be repeated. Hereinafter, monofunctional (meth)acrylates other than the above-described vinyl ether group-containing (meth)acrylic acid ester will be described. When the ink contains the monofunctional (meth)acrylate, the viscosity of the ink can be reduced, the curability of the ink is further improved, and the solubility of a photopolymerization initiator and other additives is superior. Furthermore, since the solubility of a photopolymerization initiator and other additives is superior, the ink discharge stability is further improved and the toughness, heat resistance, and chemical resistance of a coating film are improved.

Examples of the monofunctional (meth)acrylate include phenoxyethyl (meth)acrylate, isoamyl (meth)acrylate, stearyl (meth)acrylate, lauryl (meth)acrylate, octyl (meth) acrylate, decyl (meth)acrylate, isomyristyl (meth)acrylate, isostearyl (meth)acrylate, 2-ethylhexyl-diglycol (meth)acrylate, 2-hydroxybutyl (meth)acrylate, 4-hydroxybutyl (meth) acrylate, 2-methoxyethyl (meth)acrylate, butoxyethyl (meth)acrylate, ethoxy diethylene glycol (meth)acrylate, methoxy diethylene glycol (meth)acrylate, methoxy polyethylene glycol (meth)acrylate, methoxy propylene glycol (meth) acrylate, tetrahydrofurfuryl (meth)acrylate, isobornyl (meth)acrylate, 2-hydroxyethyl (meth)acrylate, 2-hydroxypropyl (meth)acrylate, 2-hydroxy-3-phenoxypropyl (meth) acrylate, lactone-modified flexible (meth) acrylate, t-butylcyclohexyl (meth) acrylate, dicyclopentanyl (meth)acrylate, dicyclopentenyloxyethyl (meth)acrylate, benzyl (meth)acrylate, ethoxylated nonylphenyl (meth) acrylate, alkoxylated nonylphenyl (meth)acrylate, and p-cumylphenol EO-modified (meth)acrylate.

Among these, from the viewpoints of further improving curability, storage stability, and the solubility of a photopolymerization initiator, a monofunctional (meth)acrylate having an aromatic ring structure in a molecule is preferable. Preferable examples of the monofunctional (meth)acrylate having an aromatic ring structure include phenoxyethyl (meth)acrylate, benzyl (meth) acrylate, 2-hydroxyphenoxypropyl (meth)acrylate, and phenoxy diethylene glycol (meth)acrylate. However, the monofunctional (meth)acrylate having an aromatic ring structure is not limited thereto. Among these, at least one of phenoxyethyl (meth)acrylate and benzyl (meth) acrylate is preferable; and phenoxyethyl (meth)acrylate is more preferable, from the viewpoints of reducing the viscosity of the ink and obtaining superior curability, wear resistance, the adhesion of the ink on a recording medium, and the solubility of a photopolymerization initiator at the same time.

As the monofunctional (meth)acrylate other than the vinyl ether group-containing (meth)acrylic acid ester, one kind may be used alone or two or more kinds may be used in combination.

The content of the monofunctional (meth)acrylate is preferably 30% by mass to 70% by mass and more preferably 40% by mass to 60% by mass with respect to the total mass (100% by mass) of the ink. When the content is in the above-described range, the viscosity, specifically, both the viscosity at 20° C. the viscosity at a discharge temperature of the ink are easily adjusted in desired ranges. Furthermore, when the content is greater than or equal to the upper limit, curability is further improved and the solubility of a photopolymerization initiator is also superior. Meanwhile, when the content is less than or equal to the above-described upper limit, curability is further improved and adhesion is also superior.

When the ink contains the vinyl ether group-containing (meth)acrylic acid ester which is a monofunctional (meth) acrylate, the content of the monofunctional (meth)acrylate includes the content of the vinyl ether group-containing (meth)acrylic acid ester.

In particular, when the ink contains the vinyl ether group-containing (meth)acrylic acid ester, the content of the vinyl ether group-containing (meth)acrylic acid ester is preferably 10% by mass to 50% by mass and more preferably 15% by mass to 40% by mass with respect to the total mass (100% by mass) of the ink. When the content is greater than or equal to the above-described lower limit, the viscosity of the ink can be reduced and the curability of the ink can be further improved. Meanwhile, when the content is less than or equal to the above-described upper limit, the storage stability of the ink can be maintained in a favorable state and curing wrinkles can be further effectively suppressed.

In addition, when the ink contains a monofunctional (meth)acrylate other than the vinyl ether group-containing (meth)acrylic acid ester, the content of the (meth)acrylate is preferably 10% by mass to 40% by mass and more preferably 10% by mass to 30% by mass. When the content is greater than or equal to the above-described lower limit, the solubility of a photopolymerization initiator as well as curability is further improved. Meanwhile, when the content is less than or equal to the above-described upper limit, adhesion as well as curability is further improved. As the monofunctional (meth)acrylate other than the vinyl ether group-contain (meth)acrylic acid ester, a monofunctional (meth)acrylate having an aromatic structure is preferable from the viewpoints of further improving curability and the solubility of a photopolymerization initiator.

3-3. Bifunctional or Higher Polyfunctional (Meth)acrylate

It is preferable that the ink contain a bifunctional or higher polyfunctional (meth)acrylate. As described above, it is more preferable that the monofunctional (meth)acrylate and the bifunctional or higher polyfunctional (meth)acrylate be used in combination.

Examples of a bifunctional (meth)acrylate include diethylene glycol (meth)acrylate, triethylene glycol (meth) acrylate, tetraethylene glycol (meth) acrylate, polyethylene glycol (meth)acrylate, dipropylene glycol (meth) acrylate, tripropylene glycol (meth) acrylate, polypropylene glycol (meth) acrylate, 1,4-butandeiol di(meth)crylate, 1,6-hexanediol di(meth)acrylate, 1,9-nonanediol di(meth)acrylate, neopentyl glycol di(meth)acrylate, dimethylol-tricyclodecane di(meth)acrylate, EO (ethylene oxide) adduct of bisphenol A di(meth)acrylate, PO (propylene oxide) adduct of bisphenol A di(meth)acrylate, hydroxypivalic acid neopentyl glycol di(meth)acrylate, and polytetramethylene glycol (meth) acrylate.

Examples of a trifunctional or higher (meth)acrylate include trimethylolpropane tri(meth)acrylate, EO-modified trimethylolpropane tri(meth)acrylate, pentaerythritol tri (meth)acrylate, pentaerythritol tetra(meth)acrylate, dipentaerythritol hexa(meth)acrylate, ditrimethylolpropane tetra (meth)acrylate, glycerin propoxy tri(meth)acrylate, caprolactone-modified trimethylolpropane tri(meth)acrylate, pentaerythritolethoxy tetra(meth)acrylate, and caprolactam-modified dipentaerythritol hexa(meth)acrylate.

As the bifunctional or higher polyfunctional (meth)acrylate, one kind may be used alone or two or more kinds may be used in combination.

It is preferable that the content of the bifunctional or higher polyfunctional (meth)acrylate be determined according to the relationship with the preferable content of the monofunctional (meth)acrylate. The content of bifunctional or higher polyfunctional (meth)acrylate is preferably 20% by mass to 60% by mass and more preferably 20% by mass to 50% by mass with respect to the total mass (100% by mass) Of the ink. When the content is in the above-described range, the curability of the ink and the wear resistance of a cured material are superior. As a result, the viscosity of the ink is easily set to a desired density. In addition, it is preferable that a monofunctional (meth)acrylate having a relatively low viscosity of the polymerizable compound alone, in particular, the vinyl ether group-containing (meth) acrylic acid ester having a particularly low viscosity; and another polymerizable compound having a relatively high viscosity be used in combination. As a result, the viscosity of the ink is easily set to a desired range.

The total content of polymerizable compounds is preferably 50% by mass to 95% by mass with respect to the total content (100% by mass) of the ink, in consideration of the relationship with the content of the other components.

In addition, the addition of a photopolymerization initiator can be omitted by using photopolymerizable compounds as the polymerizable compounds. However, it is preferable that a photopolymerization initiator be used because the start of polymerization can be easily adjusted.

4. Photopolymerization Initiator

The ink according to the embodiment may contain a photopolymerization initiator. The photopolymerization initiator is used for curing the ink on a surface of a recording medium by photopolymerization with irradiation of ultraviolet rays and forming an image thereon. By using ultraviolet (UV) rays among light rays, safety can be improved and the cost of a light source lamp can be suppressed. The photopolymerization initiator is not particularly limited as long as it generates active species such as radicals or cations with irradiation of ultraviolet rays and causes to start the polymerization of the polymerizable compounds. For example, a radical photopolymerization initiator and a cationic photopolymerization initiator can be used. Among these, a radical photopolymerization initiator is preferably used.

Examples of the radical photopolymerization initiator include aromatic ketones, acylphosphine oxide compounds, aromatic onium salt compounds, organic peroxides, thio compounds (such as thioxanthone compounds and thiophenyl group-containing compounds), hexaarylbiimidazole compounds, keto oxime ester compounds, borate compounds, adinium compounds, metallocene compounds, active ester compounds, compounds having a carbon-halogen bond, and alkylamine compounds.

Among these, acylphosphine oxide compounds are particularly preferable from the viewpoint of further improving the curability of the ink.

Specific examples of the radical photopolymerization initiator include acetophenone, acetophenonebenzylketal, 1-hydroxycyclohexylphenylketone, 2,2-dimethoxy-2-phenylacetophenone, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4'-diaminobenzophenone, Michler's ketone, benzoin propyl ether, benzoin ethyl ether, benzyldimethylketal, 1-(4-isopropylphenyl)-2-hydroxy-2-methylpropan-1-one, 2-hydroxy-2-methyl-1-phenylpropan-1-one, thioxanthone, diethylthioxanthone, 2-isopropylthioxanthone, 2-chlorothioxanthone, 2-methyl-1-[4-(methylthio) phenyl]-2-morpholino-propan-1-one, bis(2,4,6-trimethylbenzoyl)-phenylphosphine oxide, 2,4,6-trimethylbenzoyl-diphenyl-phosphine oxide, 2,4-diethylthioxanthone, and bis-(2,6-dimethoxybenzoyl)-2,4,4-trimethylpentylphosphine oxide.

Examples of commercially available products of the radical photopolymerization initiator include IRGACURE 651 (2,2-dimethoxy-1,2-diphenylethan-1-one), IRGACURE 184 (1-hydroxy-cyclohexyl-phenyl-ketone), DAROCUR 1173 (2-hydroxy-2-methyl-1-phenyl-propan-1-one), IRGACURE 2959 (1-[4-(2-hydroxyethoxy)-phenyl]-2-hydroxy-2-methyl-1-propan-1-one), IRGACURE 127 (2-hydroxy-1-{4-[4-(2-hydroxy-2-methyl-propionyl)-benzyl]phenyl}-2-methyl-propan-1-one), IRGACURE 907 (2-methyl-1-(4-methylthiophenyl)-2-morpholinopropan-1-one), IRGACURE 369 (2-benzyl-2-dimethylamino-1-(4-morpholinophenyl)-butanone-1), IRGACURE 379 (2-(dimethylamino)-2-[(4-methylphenyl)methyl]-1-[4-(4-morpholinyl) phenyl]-1-butanone), DAROCUR TPO (2,4,6-trimethylbenzoyl-diphenyl-phosphine oxide), IRGACURE 819 (bis(2,4,6-trimethylbenzoyl)-phenylphosphine oxide), IRGACURE 784 (bis(η5-2,4-cyclopentadien-1-yl)-bis(2,6-difluoro-3-(1H-pyrrol-1-yl)-phenyl)titanium), IRGACURE OXE 01 (1,2-octanedione, 1-[4-(phenylthio)-, 2-(O-benzoyloxime)]), IRGACURE OXE 02 (ethanone, 1-[9-ethyl-6-(2-methylbenzoyl)-9H-carbazol-3-yl]-, 1-(O-acetyloxime)), IRGACURE 754 (mixture of oxyphenylacetic acid, 2-[2-oxo-2-phenylacetoxyethoxy]ethylester, oxyphenylacetic acid, and 2-(2-hydroxyethoxy)ethylester) (trade names, all of which are manufactured by BASF Japan Ltd.), KAYACURE DETX-S (2,4-diethylthioxanthone) (trade name, manufactured by Nippon Kayaku Co., Ltd.), SPEEDCURE TPO (2,4,6-trimethylbenzoyl-diphenylphosphin oxide), SPEEDCURE DETX (2,4-diethylthioxanthen-9-one) (trade names, all of which are manufactured by Lambson Ltd.), LUCIRIN TPO, LR8893, LR8970 (trade names, all of which are manufactured by BASF Japan Ltd.), and UBECRYL P36 (manufactured by UCB Japan Co., Ltd.).

As the photopolymerization initiator, one kind may be used or two or more kinds may be used in combination. It is preferable that the content of the photopolymerization initiator be less than or equal to 20% by mass with respect to the total mass (100% by mass) from the viewpoints of improving the curing rate of ultraviolet rays to obtain superior curability and of avoiding the remaining of an undissolved photopolymerization initiator and coloring caused by the photopolymerization initiator.

In particular, when the photopolymerization initiator contains an acylphosphine oxide compound, the content thereof is preferably 5% by mass to 15% by mass and more preferably 7% by mass to 13% by mass with respect to the total mass (100% by mass) of the ink. When the content is greater than or equal to the above-described lower limit, curability is further improved. More specifically, particularly when curing is performed using an LED (preferably, one having an emission peak wavelength of 360 nm to 420 nm), a curing rate is sufficiently high. Therefore, curability is further improved. Meanwhile, when the content is less than or equal to the above-described upper limit, the solubility of the photopolymerization initiator is further improved.

5. Colorant

The ink according to the embodiment may contain a colorant. As the colorant, at least one of a pigment and a dye can be used.

5-1. Pigment

When a pigment is used as the colorant, the light resistance of the ink can be improved. As the pigment, both an inorganic pigment and an organic pigment can be used.

Examples of the inorganic pigment include carbon blacks (C.I. Pigment Black 7) such as furnace black, lamp black, acetylene black, iron oxide, and titanium oxide.

Examples of the organic pigment include azo pigments such as insoluble azo pigments, condensed azo pigments, azo lakes, and chelate azo pigments; polycyclic pigments such as phthalocyanine pigments, perylene and perinone pigments, anthraquinone pigments, quinacridone pigments, dioxane pigments, thioindigo pigments, isoindolinone pigments, and quinophthalone pigments; dye chelates (for example, basic dye chelates and acidic dye chelates); dye lakes (for example, basic dye lakes and acidic dye lakes); nitro pigments; nitroso pigments; aniline blacks; and daylight fluorescent pigments.

Examples of a pigment used for white ink include C.I. Pigment White 6, 18, and 21.

Examples of a pigment used for yellow ink include C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

Examples of a pigment used for magenta ink include C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, and 245; and C.I. Pigment Violet 19, 23, 32, 33, 36, 38, 43, and 50.

Examples of a pigment used for cyan ink include C.I. Pigment Blue 1, 2, 3, 15, 15:1, 15:2, 15:3, 15:34, 15:4, 16, 18, 22, 25, 60, 65, and 66; and C.I. Vat Blue 4 and 60.

In addition, examples of a pigment used for pigments other than magenta, cyan, and yellow include C.I. Pigment Green 7 and 10; C.I. Pigment Brown 3, 5, 25, and 26; and C.I. Pigment Orange 1, 2, 5, 7, 13, 14, 15, 16, 24, 34, 36, 38, 40, 43, and 63.

As the pigment, one kind may be used alone or two or more kinds may be used in combination.

When the pigment is used, the average particle size thereof is preferably less than or equal to 300 nm and more preferably 50 nm to 200 nm. When the average particle size is in the above-described range, the reliability in the discharge stability and dispersion stability of the ink can be further improved and a high-quality image can be formed. In this specification, the average particle size is measured using dynamic light scattering.

5-2. Dye

As the colorant, a dye can be used. The dye is not particularly limited, and an acid dye, a direct dye, a reactive dye, and a basic dye can be used. Examples of the dye include C.I. Acid Yellow 17, 23, 42, 44, 79, and 142; C.I. Acid Red 52, 80, 82, 249, 254, and 289; C.I. Acid Blue 9, 45, and 249; C.I. Acid Black 1, 2, 24, and 94; C.I. Food Black 1 and 2; C.I. Direct Yellow 1, 12, 24, 33, 50, 55, 58, 86, 132, 142, 144, and 173; C.I. Direct Red 1, 4, 9, 80, 81, 225, and 227; C.I. Direct Blue 1, 2, 15, 71, 86, 87, 98, 165, 199, and 202; C.I. Direct Black 19, 38, 51, 71, 154, 168, 171, and 195; C.I. Reactive Red 14, 32, 55, 79, and 249; and C.I. Reactive Black 3, 4, and 35.

As the dye, one kind may be used, or two or more kinds may be used in combination.

The content of the colorant is preferably 1% by mass to 20% by mass with respect to the total mass (100% by mass) of the ink, from the viewpoints of obtaining superior opacifying properties and color reproduction.

6. Dispersant

When the ink according to the embodiment contains the pigment, a dispersant may be added thereto in order to improve pigment dispersibility. The dispersant is not particularly limited. For example, a well-known dispersant such as a polymeric dispersant which is usually used for preparing a pigment dispersant may be used. Specific examples thereof include those containing, as a major component, one kind or more kinds of polyoxyalkylene polyamine, vinyl-based polymers and copolymers, acrylic polymers and copolymers, polyesters, polyamides, polyimides, polyurethanes, amine-based polymers, silicon-containing polymers, sulfur-containing polymers, fluorine-containing polymers, and epoxy resins. Examples of commercially available products of the polymeric dispersant include AJISPER series (trade name, manufactured by Ajinomoto Fine-Techno Co., Inc.); SOLSPERSE series (32000 and 36000 (trade name) manufactured by Avecia Co.); DISPERBYK series (trade name, manufactured by BYK Chemie); and DISPARLON series (trade name, manufactured by Kusmoto Chemicals Ltd.).

As the dispersant, one kind may be used alone or two or more kinds may be used in combination. The content of the dispersant is not particularly limited, and an appropriate amount thereof may be added.

7. Other Additives

The ink according to the embodiment contains other additives (components) other than the above-described additives. These components are not particularly limited, and examples thereof include well-known materials of the related art such as a fluorescent brightening agent (sensitizer), a silicone-based surfactant or the like, a polymerization inhibitor, a polymerization promoter, a penetration enhancer, and a wetting agent (moisturizing agent); and other additives. Examples of other additives include well-known additives of the related art such as a fixing agent, an antifungal agent, a preservative, an antioxidant, an ultraviolet absorber, a chelating agent, a pH adjuster, and a thickener.

Next, a recording medium used for the recording method and the respective steps included in the recording method will be described in detail.

8. Recording Medium

Examples of the recording medium include ink non-absorbent or low ink-absorbent recording mediums. Among the recording mediums, examples of the ink non-absorbent recording mediums include plastic films which is not subjected to a surface treatment for ink jet recording (that is, on which an ink absorbing layer is not formed); and recording mediums obtained by coating a substrate such as paper with plastic or by bonding a plastic film thereto. Examples of the plastic described herein include polyvinyl chloride (PVC), polyethylene terephthalate (PET), polycarbonate (PC), polystyrene (PS), polyurethane (PU), polyethylene (PE), and polypropylene (PP). Examples of the low ink-absorbent recording mediums include printing paper such as art paper, coated paper, and matte paper.

9. Discharging Step

In the discharging step according to the embodiment, the ultraviolet ray-curable ink is discharged onto from a head onto a recording medium at a predetermined discharge temperature. The discharge temperature is 30° C. to 40° C.

The range of 30° C. to 40° C. is relatively low for a temperature obtained by heating. In this way, the temperature (discharge temperature) of the ink to be discharged is relatively low, there are substantially no variations in temperature. As a result, an advantageous effect of improving the ink discharge stability can be obtained.

The discharge temperature described in this specification adopts values measured as follows. The temperature of a thermocouple, which is provided on a nozzle surface of a nozzle plate provided in a head, is measured before starting printing, and a measured temperature is set to the discharge temperature. However, the embodiment is not limited to this method, and any methods of measuring the discharge temperature which may be adopted in the embodiment may be used. In addition, the discharge temperature of the ink can be set to a desired temperature by adopting a configuration in which an ink heating device is arranged on a path for supplying the ink from an ink cartridge, accommodating the ink, to the head to heat the ink; and the ink heated by the ink heating device is supplied to the head.

Hereinafter, the above-described discharge temperature will be described in detail. When the temperature is higher than or equal to 30° C., discharge stability is superior. In addition, the viscosity of an ultraviolet ray-curable ink is extremely low at a temperature less than 30° C., but there is a problem in that curing wrinkles are easily generated due to this low viscosity. On the other hand, the ink according to the embodiment can avoid this problem. In particular, the above-described problem is significantly magnified when a printer is a line printer and when a light source is a light emitting diode (LED). Therefore, in particular, when a line printer or an LED is used in the embodiment, large effects are obtained.

On the other hand, when the discharge temperature is less than or equal to 40° C., an increase in the internal temperature of a recording apparatus can be suppressed.

In addition, in order to further enhance the above-described effects and to reliably avoid the above-described problems, the discharge temperature is preferably 34° C. to 40° C.

The viscosity of the ink at the above-described discharge temperature is preferably 8 mPa·s to 15 mPa·s and more preferably 8 mPa·s to 13 mPa·s. When the viscosity is in the above-described range, curing wrinkles, which may be generated by the composition of the ink, can be effectively suppressed; and unstable discharge caused by a high viscosity is prevented and thus discharge stability is further improved.

In addition, as described above, an ultraviolet ray-curable ink has a higher viscosity that that of an aqueous ink which is normally used as ink jet ink. Therefore, the viscosity largely varies depending on the variation in temperature when being discharged. Such viscosity variation of the ink largely affects on changes in the size and discharge rate of ink droplets, which may lead to deterioration in image quality. Therefore, it is preferable that the temperature (discharge temperature) of the ink to be discharged be maintained as constantly as possible. The discharge temperature of the ink according to the embodiment is relatively low and can be maintained substantially constantly. Therefore, the ink according to the embodiment has superior image quality stability.

10. Curing Step

In the curing step included in the recording method according to the embodiment, the ultraviolet ray-curable ink, attached onto the recording medium, is irradiated with ultraviolet rays (light) emitted from a light source to cure the ultraviolet ray-curable ink. In this step, the photopolymerization initiator included in the ink is decomposed into initiating species such as radicals, acids, and bases by irradiation of ultraviolet rays; and the polymerization of polymerizable compounds is promoted by the function of the initiating species. Alternatively, in this step, the polymerization of polymerizable compounds starts due to irradiation of ultraviolet rays. At this time, when the ink contains both a polymerization initiator and a sensitizing dye, the sensitizing dye in the system absorbs ultraviolet rays and is excited. When this excited sensitizing dye comes into contact with the photopolymerization initiator, the decomposition of the photopolymerization initiator is promoted, thereby achieving a higher-sensitivity curing reaction.

As the light source (ultraviolet ray source), a mercury lamp or a gas or solid-state laser is normally used. As a light source used for curing the ultraviolet ray-curable ink, a mercury lamp and a metal halide lamp are widely known. Meanwhile, currently, a mercury-free lamp is strongly desired from the viewpoint of environmental protection, and it is environmentally helpful that a GaN-based ultraviolet light-emitting device is used instead. Furthermore, a light emitting diode (LED) such as an ultraviolet light emitting diode (UV-LED) and an ultraviolet laser diode (UV-LD) has characteristics of small size, long lifetime, high efficiency, and low cost; and thus is expected as a light source for ultraviolet ray-curable ink.

As described above, both an LED and a metal halide lamp are preferably used as the light source for the ultraviolet ray-curable ink according to the embodiment, but an LED is more preferable.

The emission peak wavelength of the light source (ultraviolet ray source) is preferably 360 nm to 420 nm and 380 nm to 410 nm. When the emission peak wavelength is in the above-described range, an UV-LED is easily available at a low cost, which is preferable.

In addition, the peak intensity (irradiation peak intensity) of ultraviolet rays emitted from a light source (preferably, an LED) having an emission peak wavelength in the above-described range is preferably greater than or equal to 500 mW/cm$^2$, more preferably greater than or equal to 800 mW/cm$^2$, and still more preferably greater than or equal to 1,000 mW/cm$^2$. When the irradiation peak intensity is in the above-described range, curability is further improved and curing wrinkles can be effectively suppressed. In particular, when the ink discharged onto the recording medium is irradiated with ultraviolet rays, the initial irradiation peak intensity of the ultraviolet rays is set in the above-described range. As a result, curing wrinkles can be effectively suppressed. The reason why curing wrinkles are generated is assumed as described above. However, it is assumed that, when the irradiation peak intensity is in the above-described range, both a surface of a coating film and the inside thereof can be simultaneously cured; and as a result, curing wrinkles can be effectively suppressed. Furthermore, when the viscosity at 20° C. of the ink according to the embodiment is greater than or equal to 15 mPa·s, curing wrinkles can be more effectively suppressed. In particular, when the ultraviolet ray-curable ink contains the vinyl ether group-containing (meth)acrylic acid ester represented by the formula (I); and the irradiation peak intensity is in the above-described range, curability is further improved and curing wrinkles are more efficiently suppressed.

The irradiation peak intensity described in this specification adopts values measured using light receiving units UM-10 and UM-400 (both of which are manufactured by Konica Minolta Sensing Inc.). However, a method of measuring the irradiation peak intensity is not limited thereto, and well-known measurement methods of the related art can be used.

In addition, it is preferable that the ultraviolet ray-curable ink be curable by irradiation of ultraviolet rays having an irradiation energy of 200 mJ/cm$^2$ or less. By using the ultraviolet ray-curable ink in the recording method according to the embodiment, even when an LED having a relatively low irradiation energy amount, the ink is curable; the heat radiation of the LED can be reduced; and high-speed printing can be realized at a low cost. The lower limit of an irradiation energy that can cure the ink is not particularly limited, but is preferably greater than or equal to 100 mJ/cm$^2$.

In addition, in order to suppress heat radiation caused by irradiation, the irradiation energy during recording is preferably less than or equal to 600 mJ/cm$^2$ and more preferably less than or equal to 500 mJ/cm$^2$. The lower limit of the irradiation energy during recording is not particularly limited, but is preferably greater than or equal to 200 mJ/cm$^2$ in order to cure the ink sufficiently. When irradiation is performed multiple times, the irradiation energy during recording is the total irradiation energy of all the irradiation energy amounts.

The irradiation energy described in this specification is calculated by multiplying the irradiation peak intensity by the time from start to finish of the irradiation. When irradiation is performed multiple times, the irradiation energy is the total irradiation energy of multiple times of irradiation amounts. Single or plural emission peak wavelengths may be present in the above-described preferable wavelength range. When plural emission peak wavelengths are present therein, the total irradiation energy amount of ultraviolet rays having the emission peak wavelengths is set to the above-described irradiation energy.

Such an ink can be obtained by containing at least one of a photopolymerization initiator which is decomposed by irradiation of ultraviolet rays having the above-described wavelength range; and a polymerizable compound which causes to start polymerization due to irradiation of ultraviolet rays having the above-described wavelength range.

In addition, the amount of the ink per unit surface area discharged onto the recording medium (the amount of the ink attached) is preferably 5 mg/inch$^2$ to 16 mg/inch$^2$.

In addition, the amount of the ink discharged per unit surface area varies depending on the recording resolution and the amount of ink discharged per recording unit region (pixel) which is defined by the recording resolution. However, when being expressed by "resolution in sub-scanning direction×resolution in direction (main scanning direction) intersecting sub-scanning direction", the recording resolution (printing resolution) is preferably 300 dpi×300 dpi to 1500 dpi×1500 dpi. It is preferable that the nozzle density of the head and the amount of the ink discharged be adjusted according to this recording resolution.

The amount of the ink discharged per pixel is preferably 2 ng/pixel to 50 ng/pixel and more preferably 3 ng/pixel to 20 ng/pixel. In addition, the nozzle density (the distance between nozzles of a nozzle array) is preferably 180 dpi to 720 dpi and more preferably 300 dpi to 720 dpi.

As described above, according to the embodiment, it is possible to provide an ink jet recording method which has effects of obtaining superior curability and discharge stability; suppressing an increase in the internal temperature of a recording apparatus after continuous printing; and suppressing curing wrinkles. Furthermore, in the recording method according to the embodiment, even when an ultraviolet ray-curable ink having a low viscosity is used, an increase in the internal temperature of a recording apparatus after continuous printing can be suppressed while securing superior curability and discharge stability.

Ink Jet Recording Apparatus

An embodiment of the invention relates to an ink jet recording apparatus, that is, an ink jet printer. The recording apparatus is used in the above-described ink jet recording method according to the embodiment. Hereinafter, the recording apparatus (printer) according to the embodiment for realizing the recording method will be described in detail with reference to the drawings. However, the scope of the embodiments is not limited to the following drawings.

FIG. 1 is a block diagram illustrating a configuration example of the ink jet recording apparatus according to the embodiment. A printer driver is installed on a computer 130, and the computer 130 outputs printing data corresponding to an image a printer 1 to form an image on the printer 1. The printer 1 includes a transfer unit 20, a head unit 30, an irradiation unit 40, a detection array 110, a memory 123, an interface (I/F) 121, and a controller 120. The printer 1 that receives printing data from the computer 130, which is an external device, controls the respective units through the controller 120; and forms an image on a recording medium according to the printing data. The state in the printer 1 is monitored by a detector array 110, and the detector array 110 outputs a detection result to the controller 120. The controller 120 controls the respective units based on the detection result output from the detection array 110. The controller 120 stores printing data, input through the interface 121, in the memory 123; and includes a CPU 122 and a unit control circuit 124. Control information for controlling the respective units is also stored in the memory 123.

The printer according to the embodiment is a printer that forms various color images on a recording medium, for example, a printer that forms images using four color inks of CMYK (cyan, magenta, yellow, and black) or forms an underlying image, which gives superior opacifying properties to a recording medium, using white ink.

Examples of the kind of the printer according to the embodiment include a line printer and a serial printer. Both printers can be used as the printer. The types of these printers are different.

The line printer which is a line type ink jet recording apparatus includes a line head having a length longer than or equal to a width of the recording medium. While the line head and the recording medium move relative to each other in a scanning direction intersecting the width direction, an ink is discharged from the line head onto the recording medium, that is, onto the recording medium which is scanned relatively to the line head. In the line head, the head is fixed (substantially) without being moved and recording is performed in one pass (single pass) The line printer is superior to the serial printer from the viewpoint of a higher recording speed.

"The line head having a length longer than or equal to a width of the recording medium" described above is not limited to a case in which the width of the recording medium and the length (width) of the line head are completely the same as each other. The width of the recording medium and the length (width) of the line head may be different from each other, for example, in a case in which the length (width) of the line head corresponds to the width (recording width) of a recording medium onto which the ink is discharged (on which an image is recorded).

On the other hand, in the serial printer which is a serial type ink jet recording apparatus, while a head moves in a main scanning direction intersecting a sub scanning direction of a recording medium, main scanning (pass) of discharging ink is performed. In this way, recording is performed normally in two or more passes (multiple passes)

Ink Jet Head

The head unit 30 included in the ink jet recording apparatus (printer 1) includes a head (ink jet head) that discharges the ultraviolet ray-curable ink onto a recording medium to perform recording thereon. The head includes a cavity that accommodates the ink and causes the ink to be discharged from a nozzle; a discharge driving portion that is provided for each cavity and gives a driving force to the ink to be discharged; and the nozzle that is provided for each cavity. The cavity and the discharge driving portion and the nozzle that are provided for each cavity may be provided in plural in a single head, independently of each other. The discharge driving portion is formed of an electromechanical transducer element such as a piezoelectric element that changes the volume of the cavity with a mechanical deformation; or an electrothermal transducer element that heats the ink to generate bubbles in the ink and to discharge the ink. In the ink jet recording apparatus, one or plural heads may be provided for each color ink. When plural heads are provided, the plural heads may be arranged in parallel in the width direction of a recording medium to constitute a line head. In this case, the above-described recording width can be increased. When recording is performed using plural color inks, the ink jet recording apparatus includes a head for each ink. The head can be constituted as illustrated in FIG. 3 and the like of JP-A-2009-279830.

Figure 2:
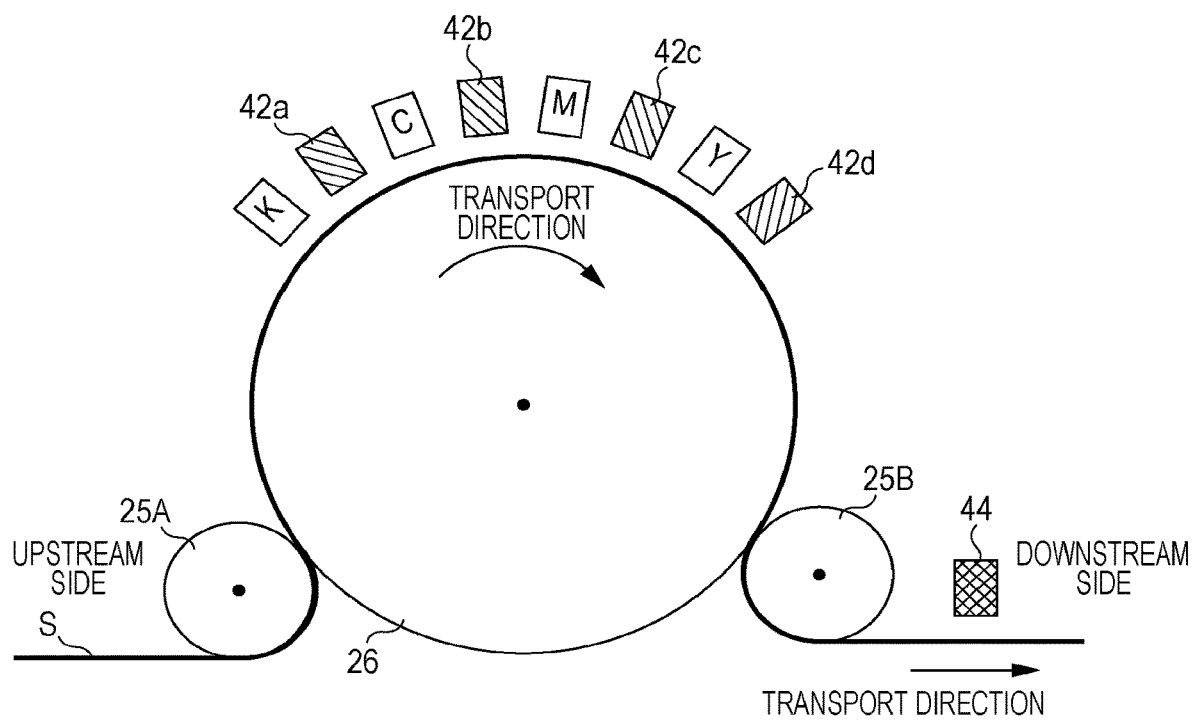
FIG. 2 is a cross-sectional view schematically illustrating an example of a configuration in the vicinity of a head unit, a transport unit, and an irradiation unit of a line printer which is an example of an ink jet recording apparatus according to an embodiment of the invention.

Hereinafter, the line printer, which is an example of the printer according to the embodiment, will be described in detail referring to FIG. 2. In FIG. 2 used for the following description, the scale size of each member is appropriately changed so as to make the size of each member recognizable.

Line Printer

FIG. 2 is a cross-sectional view schematically illustrating an example of a configuration in the vicinity of the head unit, the transport unit, and the irradiation unit of the above-described line printer which is an example of the printer according to the embodiment.

Transport rollers including an upper stream roller 25A and a lower stream roller 25B are rotated by a transport roller (not illustrated), and thus a transport drum 26 is driven. Along with the rotation of the transport rollers, a recording medium S is transported along circumferential surfaces of the transport rollers 25A and 25B and the transport drum 26 which is a support. In the vicinity of the transport drum 26, line heads including a head K, a head C, a head M, and a head Y are arranged opposite the transport drum 26.

The support has a surface on which the recording medium S is transported, supports the recording medium S, and moves relative to the heads. In FIG. 2, the transport drum 26 that corresponds to the support has a surface on which the recording medium S is transported, supports the recording medium S, moves relative to the heads, and passes through a position opposite each line head. When the support moves relatively to the heads while supporting the recording medium S, a time (period) in which the supports moves from an arbitrary position and returns to the position is preferably longer than or equal to 5 seconds and more preferably 6 seconds. When the time is in the above-described range, an increase in temperature caused by the heat radiation of the support can be suppressed. In addition, the upper limit of the period is not particularly limited, but is preferably, for example, shorter than 15 seconds in order to realize high-speed printing.

The movement of the support within a predetermined period only has to be performed at least while ink jet recording is performed; and only has to be continuously or intermittently performed while ink jet recording is performed.

The shape of the support is not limited to a drum shape illustrated in FIG. 2. Preferable examples thereof include a drum shape, a roller shape, and a plate shape (for example, a platen) that supports the recording medium S. However, the shape of the support is not limited thereto. The relative movement of the support to the heads may be performed in a method in which the support moves (rotates) from a position in a single direction and returns to the same position; or in a method in which the support moves from a position in a first direction and returns to the same position in a second direction different from the first direction. In the latter method, for example, a configuration may be adopted in which the movement in the first direction is performed while recording is performed on a sheet of recording medium; and the movement in the second direction is performed in order to perform recording on the next sheet of recording medium after finishing recording on the previous sheet of recording medium.

In the case of a serial printer, the movement in the first direction corresponds to sub-scanning. In addition, the relative movement of the support to the heads includes a case in which the heads move relatively to the support.

Examples of a material of the support include metals, resins, and rubbers. Among these, metals are preferable. However, the material of the support is not limited thereto. When the material is a metal, unlike polymer materials such as rubber, cracks which are considered to be a deterioration caused by heat are not generated even after the support is used for a long period of time. Therefore, the support can be used for a long period of time. Examples of the metal include aluminum, stainless steel, copper, and iron; and alloys thereof. However, the metal is not limited thereto. Furthermore, a metal surface of the support, that is, a transport surface of the recording medium may be coated with a coating agent or the like. As a result, the hardness of the surface of the support can be improved compared to a non-coated support; and a recording medium is not easily slipped on the support. Examples of the coating agent include organic coating agents such as resins, inorganic coating agents such as inorganic compounds, and complex coating agents thereof. However, the coating agent is not limited thereto. The above-described features relating to the support is also applicable to the serial printer as well as the line printer.

In this way, recording is performed through the discharge operation of discharging the ink to the recording medium S opposite each line head and attaching the ink thereon. Preliminary curing irradiation portions 42a, 42b, 42c, and 42d are arranged downstream of each line head in the transport direction to irradiate the recording medium S with ultraviolet rays. A main curing irradiation portion 44 is arranged further downstream thereof in the transport direction. Such a recording apparatus can be constituted as illustrated in FIG. 11 of JP-A-2010-269471.

In this specification, "preliminary curing" refers to the ink being preliminarily cured (pinned), more specifically, to the ink being preliminarily cured before main curing in order to prevent bleeding between dots and to control the dot diameter. In general, the polymerization degree of polymerizable compounds in the preliminary curing is lower than that of the polymerizable compounds in the main curing which is performed after the preliminary curing. In addition, "main curing" refers to dots, which are formed on a recording medium, being cured to a degree that is required for using a recorded material. In this specification, "curing" refers to the main curing unless specified otherwise.

The ink only has to be cured by irradiation of ultraviolet rays emitted from the main curing irradiation portion 44. Therefore, the curing operation may be finished by irradiation of only the main curing irradiation portion 44 without irradiating ultraviolet rays from a part or all of the preliminary curing irradiation portions 42a, 42b, 42c, 42d. In this way, the curing operation may be performed by only the main curing without the preliminary curing.

As described above, according to the embodiment, it is possible to provide an ink jet recording apparatus which has effects of obtaining superior curability and discharge stability; suppressing an increase in the internal temperature of a recording apparatus after continuous printing; and suppressing curing wrinkles. Furthermore, in the recording apparatus according to the embodiment, even when an ultraviolet ray-curable ink having a low viscosity is used, an increase in the internal temperature of a recording apparatus after continuous printing can be suppressed while securing superior curability and discharge stability.

EXAMPLES

Hereinafter, the embodiments will be described in detail using Examples and Comparative Examples. However, the embodiments are not limited to Examples and Comparative Examples.
Used Materials
Materials used in Examples and Comparative Examples are as follows.
Polymerizable Compounds
VEEA (trade name, 2-(2-vinyloxyethoxy)ethyl acrylate, manufactured by Nippon Shokubai Co., Ltd., monofunctional (meth)acrylate
NEW FRONTIER PHE (trade name, phenoxyethyl acrylate, manufactured by Dai-ichi Kogyo Seiyaku Co., Ltd, monofunctional (meth)acrylate; hereinafter, referred to as "PEA")
APG-100 (trade name, dipropylene glycol diacrylate, manufactured by Shin-Nakamura Chemical Co., Ltd., bifunctional (meth)acrylate; hereinafter, referred to as "DPGDA")
A-DPH (trade name, tripropylene glycol diacrylate, manufactured by Shin-Nakamura Chemical Co., Ltd., bifunctional (meth) acrylate)
Photopolymerization Initiator
DAROCUR TOP (trade name, 2,4,6-trimethylbenzoyl-diphenyl-phosphine oxide, manufactured by BASF Japan Ltd.; hereinafter, referred to as "TPO")
IRGACURE 819 (trade name, bis(2,4,6-trimethylbenzoyl)-phenylphosphine oxide, manufactured by BASF Japan Ltd.; hereinafter, referred to as "819")
Colorant
CYANINE BLUE KRO (trade name, C.I. Pigment blue 15:3 (phthalocyanine pigment), manufactured by Sanyo Color Works Ltd., pigment average particle size: 80 nm; hereinafter, referred to as "PB 15:3")
Dispersant
SOLSPERSE 32000 (trade name, manufactured by Avecia Co.; hereinafter, referred to as "32000") Preparation of Ultraviolet Ray-Curable Inks 1 to 11

Materials shown in Table 1 below were added according to contents thereof (unit: % by mass) shown in Table 1, followed by stirring with a high-speed water-cooling type stirrer. As a result, ultraviolet ray-curable inks 1 to 11 were obtained. The viscosity of each ink was set to a desired value according to the above-described viscosity setting method.
Measurement and Evaluation Items
1. Average Equivalent of Polymerizable Unsaturated Double Bond of Ink The average equivalent of polymerizable unsaturated double bond of the ink was obtained according to the above-described expressions (2) and (3).

The evaluation criteria are as follows. The evaluation results including measured values and the following ranks (criteria) are shown in Table 1.
1: From 100 to 150
2: Less than 100
3: Greater than 150
2. Measurement (Rank) of Viscosity at 20° C. of Ink Using a DVM-E type rotary viscometer (manufactured by Tokyo Keiki Inc.) the viscosity of each ink prepared above was measured under conditions of 20° C. and a rotating speed of 10 rpm.

As a rotor, a DVM-E type cone rotor having a cone angle of 1° 34' and a cone radius of 2.4 cm was used.

The evaluation criteria are as follows. The evaluation results are shown in Table 1 below.
1: Less than 15 mPa·s
2: From 15 mPa·s to 25 mPa·s
3: Greater than 25 mPa·s
3. Evaluation for Curability of Ink Each ink prepared above was coated on a PET film (PET 50 (K2411) PA-Tl 8LK (trade name), manufactured by Lintec Corporation) using a bar coater. As a result, a coating film having a thickness of 10 μm was obtained. The obtained coating film was irradiated with ultraviolet rays having an irradiation intensity of 1,000 mW/cm$^2$ and a peak wavelength of 395 nm for a predetermined time using an ultraviolet ray irradiation device (UV-LED). As a result, the coating film was cured. In a finger tack test, it was determined that an image (surface of the coating film) was cured when tackiness was disappeared.

The evaluation was performed by calculating an irradiation energy of ultraviolet rays required for curing. The irradiation energy (mJ/cm$^2$) is obtained from a product obtained by measuring an irradiation intensity (mW/cm$^2$) of ultraviolet rays, emitted from a light source to an irradiation surface; and multiplying the irradiation intensity (mW/cm$^2$) by an irradiation duration time (s). The irradiation intensity was measured using an ultraviolet ray intensity meter UM-10 and a light receiving unit UM-400 (all of which are manufactured by Konica Minolta Sensing Inc.).

The evaluation criteria are as follows. The evaluation results thereof are shown in Table 1 below.

A: The image was cured at an integrated light intensity of 200 mJ/cm² or less
B: The image was cured at an integrated light intensity exceeding 200 mJ/cm²

4. Evaluation for Storage Stability of Ink

Each ink, of which the viscosity was measured above in the item "2.", was poured into a 50 mL glass bottle. The glass bottle was hermetically sealed, was put into a constant-temperature bath at 60° C., and was left to stand for 1 week. Then, the temperature was lowered to room temperature, and the viscosity of the ink was measured in the same method as in the item "2.". The storage stability was evaluated based on the viscosity ratio before and after storage (ratio of the viscosity of the ink before storage to the viscosity of the ink after storage).

The evaluation criteria are as follows. The evaluation results thereof are shown in Table 1.
A: The viscosity ratio was less than 5%
B: The viscosity ratio was greater than or equal to 5%

μm. In Example 1, the amount of ink droplets was 7 ng. In this way, a solid pattern image was formed. The solid pattern image refers to an image in which dots are formed on all the pixels of an image (one pixel is the minimum recording unit region defined by the recording resolution).

The temperature during discharge was 35° C. as shown in the item "Discharge Temperature" of Table 2. The discharge temperature described herein was measured as follows. An ink heating device was arranged on a path for supplying the ink to the head C, and the ink heated to a desired temperature was supplied to the head C. The temperature of a thermocouple provided on a nozzle surface of the head C, was measured before starting printing, and a measured temperature is set to the discharge temperature. The nozzle surface (nozzle plate) was made of stainless steel.

Next, the ink attached onto the PET film was irradiated with ultraviolet rays to cure the ink. Specifically, first, an LED having a peak wavelength of 395 nm and an irradiation peak intensity of 500 mW/cm² was used as the light source

TABLE 1

Ultraviolet Ray-Curable Ink

| Material | Abbreviation | Ink No. of Ultraviolet Ray-Curable Ink | | | | | | | | | | |
|---|---|---|---|---|---|---|---|---|---|---|---|---|
| | | 1 | 2 | 3 | 4 | 5 | 6 | 7 | 8 | 9 | 10 | 11 |
| Polymerizable | VEEA | 20 | 20 | 30 | 40 | 70 | 75 | 7 | 28 | 38 | 5 | 60 |
| Compounds | PEA | 40 | 20 | 20 | 10 | — | 5 | 55 | 60 | 10 | 9 | — |
| | DPGDA | 20 | 36 | 30 | 30 | 10 | — | 26 | — | 40 | 70 | — |
| | A-DPH | 8 | 12 | 8 | 8 | 8 | 8 | — | — | — | 4 | 28 |
| Photopolymerization | 819 | 3 | 3 | 3 | 3 | 3 | 3 | 3 | 3 | 3 | 3 | 3 |
| Initiator | TPO | 5 | 5 | 5 | 5 | 5 | 5 | 5 | 5 | 5 | 5 | 5 |
| Dispersant | 32000 | 1 | 1 | 1 | 1 | 1 | 1 | 1 | 1 | 1 | 1 | 1 |
| Colorant | PB15:3 | 3 | 3 | 3 | 3 | 3 | 3 | 3 | 3 | 3 | 3 | 3 |
| Total | | 100 | 100 | 100 | 100 | 100 | 100 | 100 | 100 | 100 | 100 | 100 |
| Average Equivalent of Polymerizable Unsaturated Double Bond (Rank) | | 1 | 1 | 1 | 1 | 2 | 2 | 3 | 3 | 1 | 1 | 2 |
| Viscosity at 20° C. (Rank) | | 2 | 2 | 2 | 2 | 1 | 1 | 3 | 2 | 1 | 3 | 2 |
| Curability | | A | A | A | A | A | A | B | B | A | B | A |
| Storage Stability | | A | A | A | B | B | B | A | A | A | A | B |

The ultraviolet ray-curable inks 1 to 4 and 9 correspond to the inks used in Examples; and the ultraviolet ray-curable inks 5 to 8, 10, and 11 correspond to the inks used in Comparative Examples.

Hereinafter, recording methods according to the respective Examples and Comparative Examples will be described.

Example 1

The line printer illustrated in FIG. 2 was used in which four line heads having a length substantially equal to a width (recording width) of a recording surface, on which an image is to be recorded, were arranged in parallel in the width direction. Among the heads and light sources in FIG. 2, the head C and the light sources 42b and 44 were used; and the other heads and light sources were not used.

The transport drum 26 was made of aluminum; the diameter of the transport 26 was 500 mm; the printing speed was 285 mm/s; and the drum rotation period was 5.5 s.

The ink 1 shown in Table 2 was continuously discharged for 10 minutes (continuous printing was performed for 10 minutes) from the head C having a nozzle density of 600 dpi onto the PET film (PET 50 (K2411) PA-Tl 8LK) under conditions of a recording resolution of 600 dpi×600 dpi and one pass (single pass). The amount of ink droplets per pixel was adjusted such that the thickness of the cured film was 11

42b. Ultraviolet rays having an irradiation energy of 20 mJ/cm2 was emitted from the LED to preliminarily cure the ink. An LED having a peak wavelength of 395 nm and an irradiation peak intensity of 1,500 mW/cm² was used as the light source 44. Ultraviolet rays having an irradiation energy of 400 mJ/cm2 was emitted from the LED for a predetermined time to cure the solid pattern image. In this way, the solid pattern image was cured and thus a recorded material is obtained. In a finger tack test, it was confirmed that the tackiness of the image (surface of the coating film) was disappeared.

Examples 2 to 7 and Comparative Examples 1 to 12

A recorded material was obtained in the same method as that of Example 1, except that the used ink and the discharge temperature were respectively changed according to Tables 2 and 3 below.

Example 8

A recorded material was obtained in the same method as that of Example 1, except that the diameter of the transport drum 26 was 318 mm and the drum rotation period was 3.5 s (printing speed was the same as that of Example 1).

Example 9

A recorded material was obtained in the same method as that of Example 1, except that a metal halide lamp (in Table 2, abbreviated as "MHL") was used as the light source 42b instead of a LED.

Example 10

A recorded material was obtained in the same method as that of Example 1, except that a serial printer in which an LED having a peak intensity of 500 mW/cm$^2$ was mounted adjacent to a carriage as a light source was used instead of the line printer. The used serial printer was an ink jet printer illustrated in FIG. 2 of JP-A-2010-167677. A nozzle array of a head (serial head) was filled with the ink 1. Dots were formed on the same recording region of the PET film in 4 passes (2 passes in the main scanning direction×2 passes in the sub-scanning direction) under conditions of a nozzle density of the head of 300 dpi; an amount of ink droplets of 7 ng; a recording resolution of 600 dpi×600 dpi (a recording resolution per 1 pass of 300 dpi×300 dpi); and a discharge temperature of 35° C. As a result, a solid pattern image having a thickness of 11 μm was formed.

The same light source 42b and LED mounted on the above-described line printer were provided on the carriage of the printer so as to have the same length as that in the sub-scanning direction of the head. The irradiation energy per pass was 40 mJ/cm$^2$, and preliminary curing was performed for each pass. The same LED as the light source 44 mounted on the above-described line printer were provided in the width direction and downstream of the carriage of the printer in the transport direction of the recording medium so as to have the same length as that of the recording medium. The solid image of the recording medium, which was transported to the downstream side of the carriage in the transport direction of the recording medium, was irradiated with ultraviolet rays having an irradiation energy of 400 mJ/cm2 to cure the solid image. As a result, the solid image was cured and thus a recorded material was obtained. Similarly to the case of Example 1, in a finger tack test, it was confirmed that the tackiness of the image (surface of the coating film) was disappeared.

Measurement and Evaluation Items

5. Evaluation for Discharge Stability

Using each ink having the number show in Tables 2 and 3, printing was continuous performed for 10 minutes (the ink was continuously discharged from 300 nozzles for 10 minutes). Before starting printing, 500 droplets of the ink were further discharged from the nozzles to measure the amount (mass) of one droplet discharged. Immediately after finishing printing, the amount (mass) of one droplet discharged was measured in the same method as that before printing.

The evaluation criteria are as follows. The evaluation results thereof are shown in Tables 2 and 3.

A: During continuous printing, there were no nozzles which did not discharge droplets. The change of the amount of one droplet after finishing printing to the amount of one droplet before starting printing was less than or equal to 5%

B: During continuous printing, there were no nozzles which did not discharge droplets. The change of the amount of one droplet after finishing printing to the amount of one droplet before starting printing was greater than 5%

C: During continuous printing, there were nozzles which did not discharge droplets The following items "6." and "7." relate to the evaluation for an increase of the internal temperature of a recording apparatus after continuous printing. In order to improve the reliability of the evaluation results, the evaluation is performed at plural points in the recording apparatus. As the plural points of the recording apparatus, the nozzle surface of the nozzle plate on the head side and the drum on the recording medium were selected.

6. Evaluation for Increase on Nozzle Surface of Head after Continuous Printing

Before starting printing, the temperature of the thermocouple, provided in the nozzle surface of the nozzle plate, was measured. After continuously performing printing for 10 minutes, the temperature of the thermocouple was measured. The difference between the temperature before starting printing and the temperature after continuous printing was evaluated as an increase in the temperature of the nozzle surface of the head after continuous printing.

The evaluation criteria are as follows. The evaluation results thereof are shown in the abbreviation "Temperature Increase of Nozzle Surface After Continuous Printing" of Tables 2 and 3.

A: Lower than 10° C.

B: 10° C. or higher and lower than 15° C.

C: 15° C. or higher

7. Evaluation for Increase of Drum after Continuous Printing

Examples and Comparative Examples other than Example 10 were evaluated as follows. The surface temperature of a position of the surface of the transport drum opposite the head was measured before starting printing. After continuously performing printing for 10 minutes, the surface temperature of the transport drum opposite the head was measured in the same method as that before starting printing. The difference between the surface temperature before staring printing and the surface temperature after continuous printing was evaluated as an increase in the temperature of the transport drum after continuous printing.

In Example 10, the evaluation was performed in the same method as that of the other Example and Comparative Examples, except that the surface temperatures of a platen were measured before starting printing and after continuous printing instead of that of the transport drum opposite the head.

The evaluation criteria are as follows. The evaluation results thereof are shown in the abbreviation "Temperature Increase of Drum After Continuous Printing" of Tables 2 and 3. In Example 10, to be exact, "Temperature Increase of Drum After Continuous Printing" refers to an increase in the temperature of the platen after continuous printing.

A: Lower than 10° C.

B: 10° C. or higher and lower than 15° C.

C: 15° C. or higher

8. Evaluation for Curing Wrinkles

Regarding each of the recorded materials obtained in Examples and Comparative Examples, the surface of the cured film (cured coating film) was visually inspected. The evaluation criteria are as follows. The evaluation results thereof are shown in Tables 2 and 3.

A: No wrinkles were observed

B: Wrinkles are observed on a partial region of the cured film

C: Wrinkles are observed on the entire surface of the cured film

TABLE 2

| | Examples | | | | | | | | | |
|---|---|---|---|---|---|---|---|---|---|---|
| Item/Example No. | 1 | 2 | 3 | 4 | 5 | 6 | 7 | 8 | 9 | 10 |
| Ink No. | 1 | 1 | 1 | 2 | 3 | 4 | 9 | 1 | 1 | 1 |
| Average Equivalent of Polymerizable Unsaturated Double bond | 1 | 1 | 1 | 1 | 1 | 1 | 1 | 1 | 1 | 1 |
| Viscosity at 20° C. (Rank) | 2 | 2 | 2 | 2 | 2 | 2 | 1 | 2 | 2 | 2 |
| Discharge Temperature (° C.) | 35 | 30 | 40 | 35 | 35 | 35 | 35 | 35 | 35 | 35 |
| Curing Light Source | LED | LED | LED | LED | LED | LED | LED | LED | MHL | LED |
| Drum Rotation Period (s) | 5.5 | 5.5 | 5.5 | 5.5 | 5.5 | 5.5 | 5.5 | 3.5 | 5.5 | Serial |
| Discharge Stability | A | A | A | A | A | A | A | A | A | A |
| Temperature Increase of Nozzle Surface After Continuous Printing | 4° C. | 2° C. | 7° C. | 6° C. | 6° C. | 7° C. | 4° C. | 7° C. | 6° C. | 2° C. |
| Temperature Increase of Drum After Continuous Printing | 6° C. | 3° C. | 8° C. | 7° C. | 7° C. | 9° C. | 5° C. | 13° C. | 11° C. | 4° C. |
| Curing Wrinkles | A | A | A | A | A | A | C | A | A | A |

TABLE 3

| | Comparative Examples | | | | | | | | | | | |
|---|---|---|---|---|---|---|---|---|---|---|---|---|
| Item/Comparative Example No. | 1 | 2 | 3 | 4 | 5 | 6 | 7 | 8 | 9 | 10 | 11 | 12 |
| Ink No. | 1 | 1 | 5 | 5 | 5 | 7 | 7 | 7 | 10 | 6 | 11 | 8 |
| Average Equivalent of Polymerizable Unsaturated Double bond | 1 | 1 | 2 | 2 | 2 | 3 | 3 | 3 | 1 | 2 | 2 | 3 |
| Viscosity at 20° C. (Rank) | 2 | 2 | 1 | 1 | 1 | 3 | 3 | 3 | 3 | 1 | 2 | 2 |
| Discharge Temperature (° C.) | 43 | 28 | 40 | 43 | 28 | 40 | 43 | 28 | 40 | 40 | 40 | 40 |
| Curing Light Source | LED | LED | LED | LED | LED | LED | LED | LED | LED | LED | LED | LED |
| Drum Rotation Period (s) | 5.5 | 5.5 | 5.5 | 5.5 | 5.5 | 5.5 | 5.5 | 5.5 | 5.5 | 5.5 | 5.5 | 5.5 |
| Discharge Stability | B | C | B | B | B | C | B | C | C | B | B | A |
| Temperature Increase of Nozzle Surface After Continuous Printing | 13° C. | 3° C. | 17° C. | 20° C. | 11° C. | 4° C. | 12° C. | 2° C. | 4° C. | 17° C. | 17° C. | 4° C. |
| Temperature Increase of Drum After Continuous Printing | 12° C. | 4° C. | 16° C. | 16° C. | 13° C. | 6° C. | 11° C. | 3° C. | 6° C. | 16° C. | 16° C. | 6° C. |
| Curing Wrinkles | A | A | C | C | C | A | A | A | A | C | B | B |

It was found from the above results that superior curability and discharge stability were obtained; the temperature increase after continuous printing was suppressed; and curing wrinkles are suppressed when a specific ink jet recording method (Examples) is compared to the other recording methods (Comparative Examples), the specific ink jet recording method including: the discharging step of discharging an ultraviolet ray-curable ink, which has a viscosity at 20° C. of 25 mPa·s or less and an average equivalent of polymerizable unsaturated double bond of 100 to 150, from a head onto a recording medium at a discharge temperature of 30° C. to 40° C.; and the curing step of irradiating the ultraviolet ray-curable ink, attached onto the recording medium, with ultraviolet rays emitted from a light source to cure the ultraviolet ray-curable ink. Hereinafter, each of Examples and Comparative Examples will be discussed. However, the scope of the embodiments is not limited to the following discussion.

First, when the viscosity at 20° C. of the ultraviolet ray-curable ink was less than or equal to 25 mPa·s, curability was superior. In addition, when the average equivalent of polymerizable unsaturated double bond of the ultraviolet ray-curable ink was greater than or equal to 100, the storage stability of the ink was superior. Furthermore, when the average equivalent was less than or equal to 150, the curability of the ink was superior. Therefore, in the case of actual recording in which plural color inks are used, the irradiation energy of the light source 42b, which is required to perform the minimum curing for preventing the color inks from being mixed, can be reduced. As a result, an increase in the temperature of the transport drum 26, caused by the irradiation and heat radiation of the light source 42b, can be reduced. Therefore, the above-described configuration is assumed to be preferable in the embodiments.

In addition, when the average equivalent of polymerizable unsaturated double bond of the ultraviolet ray-curable ink was less than 100; or when the discharge temperature was higher than 40° C., the increase in the temperature of the nozzle surface of the head after continuous printing and the increase in the temperature of the transport drum after continuous printing were significant. More specifically, it is assumed that, when the average equivalent of polymerizable unsaturated double bond of the ultraviolet ray-curable ink was less than 100, the amount of reaction heat generated during curing was large; and as a result, the internal temperature of the recording apparatus after continuous printing was significantly increased.

When the temperature of the transport drum after continuous printing is significantly increased, the recording medium may be thermally deformed, which may cause a problem in that the quality of an obtained recorded material deteriorates. Meanwhile, when the temperature of the nozzle surface of the head after continuous printing is significantly increased, the amount of ink droplets discharged is largely changed, which may cause a problem in that image stability deteriorates. On the other hand, according to Examples, an increase in both temperatures of the transport drum and the nozzle surface can be effectively suppressed. Therefore, the above-described problems do not occur.

In addition, in Example 8 in which the drum rotation period (s) was shorter than that of the other examples, particularly, the temperature of the transport drum after continuous printing was further increased.

In addition, in Example 9 in which the metal halide lamp was used as the curing light source instead of LED, the temperature of the transport drum after continuous printing was further increased. The reason is considered to be that the temperature of the transport drum was significantly increased due to heat radiation of the metal halide lamp. When a metal halide lamp is used as a light source, there are cases in which the temperature of the recording medium may be thermally deformed due to an increase in the temperature of the transport drum caused by the heat radiation; or an installment size may be necessary because the metal halide lamp has a larger size than that of an LED. That is, it is preferable that an LED be used from the viewpoints of effectively suppressing an increase in the temperature of the transport drum after continuous printing; and of obtaining a low-heat-generating and space-saving recording apparatus.

In addition, in Example 10 in which the serial printer was used instead of the line printer, the temperature increase is less than that of the line printer; whereas the recording speed is lower than that of the line printer. That is, in the recording method according to the embodiment, it is assumed that recording capable of effectively suppressing curing wrinkles can be performed using a line printer even at a high speed.

Although not shown in the examples, as the irradiation peak intensity of the light source (LED) 42b was higher, curing wrinkles were suppressed more effectively. In particular, when the ink discharged onto the recording medium was irradiated with ultraviolet rays, the initial irradiation peak intensity of the ultraviolet rays was set to be preferably greater than or equal to 500 mW/cm$^2$ and more preferably greater than or equal to 800 mW/cm$^2$. As a result, curing wrinkles were suppressed more effectively.

Although not shown in the examples, a recorded material was obtained in the same method as that of Example 1, except that a material of half portions of the transport drum on the surface side of the drum other than portions on a shaft side of the transport drum were made of rubber not aluminum. After a long period of use (6 months), cracks were generated. The reason is considered to be that the rubber surface of the transport drum deteriorated due to heat. Therefore, it is considered that a metal is preferable as the material of the transport drum.

The entire disclosure of Japanese Patent Application No. 2012-102535, filed Apr. 27, 2012 and 2012-250029, filed Nov. 14, 2012 are expressly incorporated by reference herein.

What is claimed is:

1. An ink jet recording method comprising:
    discharging an ultraviolet ray-curable ink, which has a viscosity at 20° C. of 25 mPa·s or less and an average equivalent of polymerizable unsaturated double bond of 100 to 150, from a head onto a recording medium at a discharge temperature of 30° C. to 40° C.; and
    irradiating the ultraviolet ray-curable ink, attached onto the recording medium, with ultraviolet rays emitted from a light source to cure the ultraviolet ray-curable ink,
    wherein the ultraviolet ray-curable ink comprises a monofunctional (meth) acrylate having an aromatic structure in an amount of 10% by mass or more.

2. The ink jet recording method according to claim 1, wherein the head is a line head having a length longer than or equal to a width of the recording medium, and recording is performed using a line type ink jet recording apparatus that discharges the ultraviolet ray-curable ink from the line head onto the recording medium which is scanned relative to the line head.

3. The ink jet recording method according to claim 1, wherein a support has a surface on which the recording medium is transported, supports the recording medium, and moves relative to the head, and a time period in which the support moves relative to the head from a position and returns to the position is longer than or equal to 5 seconds.

4. The ink jet recording method according to claim 3, wherein a material of the support for the recording medium is a metal.

5. The ink jet recording method according to claim 1, wherein a viscosity at 20° C. of the ultraviolet ray-curable ink is 15 mPa·s to 25 mPa·s.

6. The ink jet recording method according to claim 1, wherein the light source is a light emitting diode.

7. The ink jet recording method according to claim 1, wherein the ultraviolet ray-curable ink contains 30% by mass to 70% by mass of monofunctional (meth)acrylate and 20% by mass to 60% by mass of bifunctional or higher polyfunctional (meth)acrylate.

8. The ink jet recording method according to claim 1, wherein the ultraviolet ray-curable ink is curable by irradiation of ultraviolet rays having an irradiation energy of 200 mJ/cm2 or lower.

9. An ink jet recording apparatus which performs recording using the ink jet recording method according to claim 1.

10. An ink jet recording apparatus which performs recording using the ink jet recording method according to claim 2.

11. An ink jet recording apparatus which performs recording using the ink jet recording method according to claim 3.

12. An ink jet recording apparatus which performs recording using the ink jet recording method according to claim 4.

13. An ink jet recording apparatus which performs recording using the ink jet recording method according to claim 5.

14. An ink jet recording apparatus which performs recording using the ink jet recording method according to claim 6.

15. An ink jet recording apparatus which performs recording using the ink jet recording method according to claim 7.

16. An ink jet recording apparatus which performs recording using the ink jet recording method according to claim 8.

17. The ink jet recording method according to claim 1, wherein a content of the monofunctional (meth) acrylate is 30% by mass to 70% by mass with respect to the total mass of the ink composition.

18. The ink jet recording method according to claim 1, wherein the ultraviolet ray-curable ink further comprises a vinyl ether group-containing (meth)acrylic acid ester represented by formula (I):

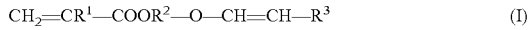

$$CH_2=CR^1-COOR^2-O-CH=CH-R^3 \quad (I)$$

(in the formula, R$^1$ represents a hydrogen atom or a methyl group, R$^2$ represents a divalent organic residue having 2 to 20 carbon atoms, and R$^3$ represents a hydrogen atom or a monovalent organic residue having 1 to 11 carbon atoms).

19. An ink jet recording method according to claim 1, wherein the monofunctional (meth) acrylate having an aromatic structure comprises at least one of phenoxyethyl (meth) acrylate, benzyl (meth) acrylate, 2-hydroxyphenoxypropyl (meth) acrylate, or phenoxy diethylene glycol (meth) acrylate.

* * * * *